United States Patent
Chillar et al.

(10) Patent No.: US 12,449,779 B2
(45) Date of Patent: Oct. 21, 2025

(54) CUSTOMIZED ASSET PERFORMANCE OPTIMIZATION AND MARKETPLACE

(71) Applicant: HONEYWELL INTERNATIONAL INC., Charlotte, NC (US)

(72) Inventors: Rahul Chillar, Atlanta, GA (US); Srinivasan Dattarajan, Bangalore (IN); Ilangovan R, Bangalore (IN); Sparsh Arora, Bareilly (IN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 388 days.

(21) Appl. No.: 17/867,482

(22) Filed: Jul. 18, 2022

(65) Prior Publication Data

US 2023/0266733 A1 Aug. 24, 2023

Related U.S. Application Data

(60) Provisional application No. 63/313,390, filed on Feb. 24, 2022.

(51) Int. Cl.
G05B 19/04 (2006.01)
G05B 19/042 (2006.01)

(52) U.S. Cl.
CPC .......... *G05B 19/0426* (2013.01); *G05B 2219/23008* (2013.01)

(58) Field of Classification Search
CPC ...... G05B 19/0426; G05B 2219/23008; G05B 23/0283; G05B 23/0297; G05B 23/0224;
(Continued)

(56) References Cited

U.S. PATENT DOCUMENTS

2009/0119657 A1* 5/2009 Link, II .................. G06F 8/64
717/171
2016/0078695 A1 3/2016 McClintic et al.
(Continued)

FOREIGN PATENT DOCUMENTS

EP 3483799 A1 5/2019

OTHER PUBLICATIONS

AU Office Action Mailed on Nov. 1, 2023 for AU Application No. 2023201036, 3 page(s).
(Continued)

*Primary Examiner* — Christopher W Carter
(74) *Attorney, Agent, or Firm* — ALSTON & BIRD LLP

(57) ABSTRACT

Various embodiments for a customized asset performance system and marketplace are described herein. An embodiment operates by receiving asset data indicating one or more assets that are being monitored by a control system. Telemetry data for at least a first asset is received, the telemetry data including data corresponding to a previous functionality of the asset over a specified period of time. The telemetry data is compared to an expected functionality over the specified period of time. A problem with the first asset is identified based on the comparing. One or more software packages that are configured to address the problem with the first asset are identified based on comparing the telemetry data to an expected functionality of the first asset over the specified period of time. A selection of a first software package from the one more software packages is received and the selected first software package is updated.

14 Claims, 16 Drawing Sheets

(58) Field of Classification Search
CPC ................ G06F 8/65; G06Q 10/06375; G06Q 10/06393; G06Q 10/20; G06Q 50/04; G06Q 10/06395
See application file for complete search history.

(56) References Cited

U.S. PATENT DOCUMENTS

2017/0323239 A1 11/2017 Johnson et al.
2019/0147412 A1 5/2019 Chiaramonte et al.

OTHER PUBLICATIONS

Extended European search report Mailed on Jun. 21, 2023 for EP Application No. 23158124, 8 page(s).
SA Office Action Mailed on Aug. 7, 2024 for SA Application No. 123441289, 13 page(s).
SA Office Action Mailed on Jan. 30, 2025 for SA Application No. 123441289, 17 page(s).
AU Notice of Allowance Mailed on Oct. 28, 2024 for AU Application No. 2023201036, 3 page(s).
SA Notice of Allowance Mailed on May 18, 2025 for SA Application No. 123441289, 2 page(s).

* cited by examiner

FIG. 3

HONEYWELL FORGE

< MINING - QUESTIONNAIRE

| Asset Details* | Qty* | What problems are faced in monitoring?* |
|---|---|---|
| Haul Truck ▾ | < 1 > | Unscheduled maintenance ▾ |

| Asset Details* | Qty* | What problems are faced in monitoring?* |
|---|---|---|
| Select an option ▾ | < 1 > | Select an option ▾ |

+ Add Asset

[View Recommendations]

Q Search

HONEYWELL FORGE

< MINING - QUESTIONNAIRE

Asset Details*
[ Haul Truck ⌄ ]

Asset Details*
[ Excavators and Shovels ⌄ ]

+ Add Asset

[ View Recommendations ]

500                                                                    ✕

Problem: Workers are mishandling the equipments

Haul Truck                                          Qty [ ⌃ 1 ⌄ ]

Recommendations

| Up to $4400 savings | Up to $11000 savings |
|---|---|
| Health + Excel | Health + Excel Predict + Optimize |
| Price: $1200 | Price: $5200 |
| Benefits | Benefits |
| Asset utilization improves by 2% | Asset utilization improves by 2% |
| Energy efficiency up by 3% | Energy efficiency up by 3% |
| Labour Productivity increases by 5% | Labour Productivity increases by 4% |
| 🛒 Add | 🛒 Add |

Problem: Too many Assets to monitor, Unscheduled maintenance

Excavators and Shovel                    Qty [ ⌃ 1 ⌄ ]

Recommendations

| Up to $4500 savings | Up to $11000 savings |
|---|---|
| Health + Excel | Health + Excel Predict + Optimize |
| Price: $2200 | Price: $5200 |
| Benefits | Benefits |
| Asset utilization improves by 2% | Asset utilization improves by 2% |

Total                    Savings $8800         Price $4400

FIG. 5

HONEYWELL FORGE

Asset Model/Upload

Centrifugal Compressor Monitoring

| Industry | Asset Class | Asset Type |
|---|---|---|
| Oil and Gas | Compressor | Centrifugal |

| Created by | Date | Version |
|---|---|---|
| James Matthew | 06/20/21 | 1.0 |

Uploads

| | Status |
|---|---|
| Centrifugal Compressor Specifications.xml | ✓ Successful ✕ |
| Centrifugal Compressor Specification1.pdf | ✓ Successful ✕ |
| Centrifugal Compressor Specification2.xml | ✓ Successful ✕ |
| Centrifugal Compressor Specification3.xml | ✓ Successful ✕ |

☑ Model upload
☑ Document upload
☑ Terms and Conditions and Special Terms

Cancel | Submit

FIG. 13

CUSTOMIZED ASSET PERFORMANCE OPTIMIZATION AND MARKETPLACE

CROSS-REFERENCE TO RELATED APPLICATIONS

This application claims priority to U.S. Provisional Patent Application 63/313,390, titled "Customized Asset Performance Optimization and Marketplace", filed Feb. 24, 2022 to Chillar, et. al. (4584.0080000), which is hereby incorporated by reference in its entirety.

BACKGROUND

Monitoring the operations and properly maintaining assets at a manufacturing plant, storage warehouse, or other commercial or industrial facility are important to a facilities manager who may be responsible for maintaining or increasing production output and managing a safe work environment. Asset performance monitoring and management may include monitoring the ongoing operations and health of various assets that are being used in a facility, such as pumps, heaters, fans, liquid storage tanks, vehicles, or other equipment to ensure they are being properly maintained or otherwise optimized to meet certain goals. Failures in any of these assets may result in reducing or halting production, may risk the health and safety of employees and others, and may be financially costly to fix.

BRIEF DESCRIPTION OF THE FIGURES

The accompanying drawings are incorporated herein and form a part of the specification.

FIG. 3 illustrates an example software selection interface of APS, according to some embodiments.

FIG. 4 illustrates an example questionnaire of APS, according to some embodiments.

FIG. 5 illustrates an example recommendation provided by APS, according to some embodiments.

FIG. 6 illustrates an example developer submission interface of APS, according to some embodiments.

FIG. 8 illustrates an example software rejection interface of APS, according to some embodiments.

FIG. 9 illustrates an example software approval interface of APS, according to some embodiments.

FIG. 13 illustrates an exemplary user interface, according to one or more embodiments.

In the drawings, like reference numbers generally indicate identical or similar elements. Additionally, generally, the left-most digit(s) of a reference number identifies the drawing in which the reference number first appears.

DETAILED DESCRIPTION

Monitoring the operations and properly maintaining assets at a manufacturing plant, storage warehouse, or other commercial or industrial facility are important to a facilities manager who may be responsible for maintaining or increasing production output and managing a safe work environment. Asset performance monitoring and management may include monitoring the ongoing operations and health of various assets that are being used in a facility, such as pumps, heaters, fans, liquid storage tanks, vehicles, or other equipment to ensure they are being properly maintained or otherwise optimized to meet certain goals. Failures in any of these assets may result in reducing or halting production, may risk the health and safety of employees and others, and may be financially costly to fix.

Figure 1:
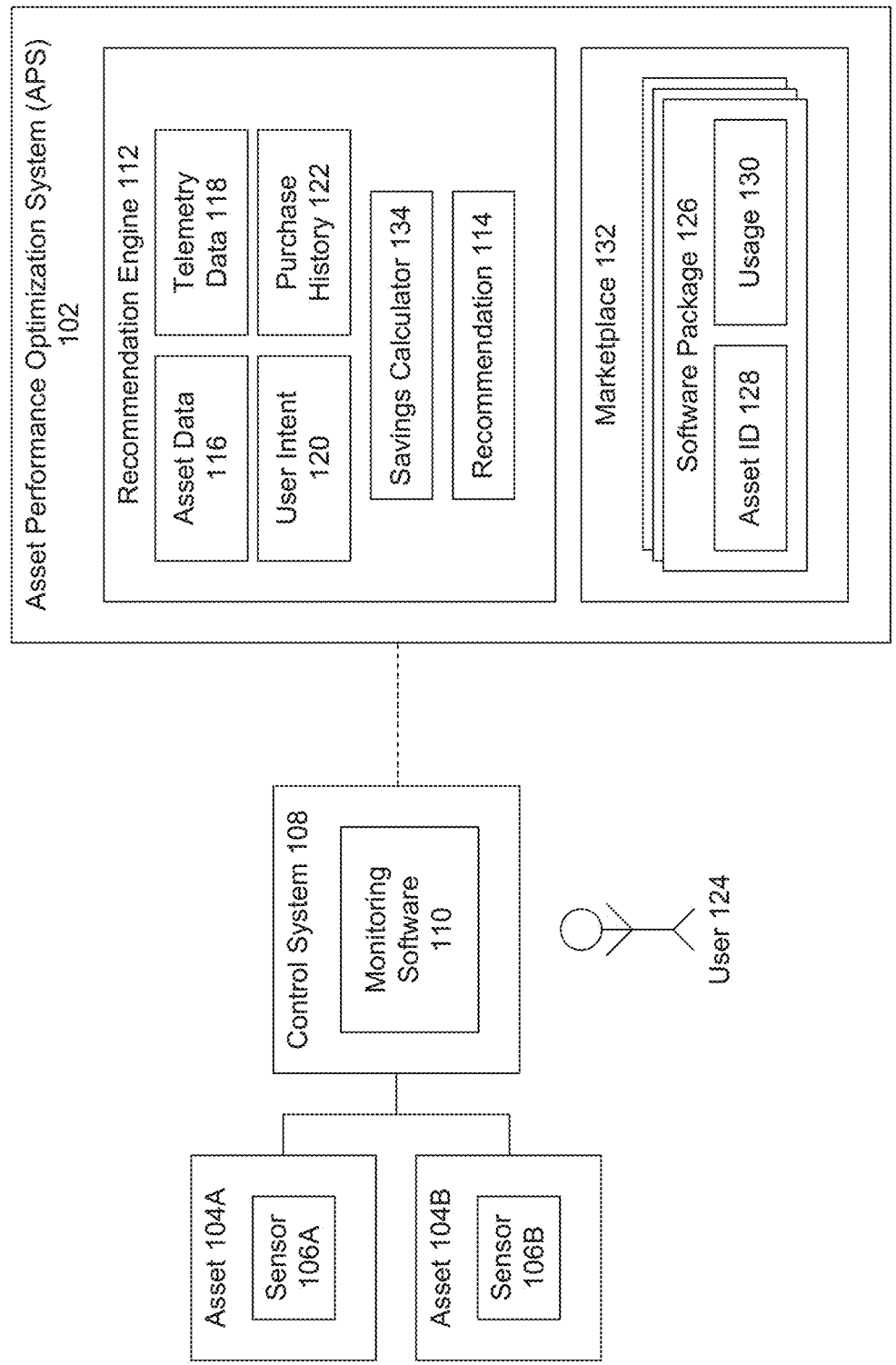
FIG. 1 illustrates a block diagram of an asset performance optimization system (APS), according to some example embodiments.

FIG. 1 illustrates a block diagram of an asset performance optimization system (APS) 102, according to some example embodiments. APS 102 may help improve the monitoring, maintenance, and functionality of various assets 104A, 104B across one or more facilities.

Assets 104A, 104B (referred to herein generally as asset 104 or assets 104) may include any machinery or equipment that is used in a commercial or industrial facility or organization. Example assets 104 include, but are not limited to, pipelines, liquid storage tanks, vehicles, air pumps, cranes, condensers, filters, etc.

In some embodiments, assets 104 may include one or more sensors 106A, 106B (referred to generally as sensor 106 or sensors 106). Each illustrated sensor 106 may represent a variety of different sensors used to track various mechanical, functional, or operational metrics regarding the particular device, vehicle, or other asset 104. For example, if asset 104A is a pipe, the sensor 106A may include fill level, flow rate, pressure, and/or temperature sensors. Or, for example, if asset 104B is a bulldozer, sensor 106B may include oil, gas, speed, acceleration, RPM (revolutions per minute), mileage, and engine temperature.

In some embodiments, a control system 108 may monitor or receive data from the sensors 106 across one or more assets 104. Control system 108 may include a computing system or control panel that is communicatively coupled to receive or retrieve data from the various sensors 106 across one or more assets 104, either in real-time or periodically. Control system 108 may include an interface that enables a user 124, such as a facilities manager, to monitor the operational statuses of one or more assets 104. In some embodiments, control system 108 may enable user 124 to adjust the operational or functional settings of assets 104.

For the sake of simplicity, only a single control system 108 is illustrated; however it is understood that other embodiments may include multiple control systems 108. In some embodiments, different assets 104 may be connected to different control systems 108. For example a first control system 108 for pipelines may be different from a second control system 108 for storage tanks which is different from a third control system 108 for vehicles. In some embodiments, a particular facility may include a master control system (not shown) that retrieves and displays data across a variety of different or related control systems 108. The master control system may enable user 124 to view display and manage the various control systems 108 located across one or more facilities.

In some embodiments, control system 108 may include, be configured to execute, or may be executing monitoring software 110. Monitoring software 110 may include any programs, apps, applications or other software or computer code, that is configured to process data received from sensors 106. In some embodiments, monitoring software 110 may be executed locally on control system 108 which may be physically located within a facility. In other embodiments, monitoring software 110 may be executed in a cloud computing environment which is communicatively coupled to control system 108.

In some embodiments, monitoring software 110 may be configured with alarms or warnings when an asset 104 is not operating as expected, or when maintenance is required. Monitoring software 110 may analyze the data from sensors 106, perform calculations and projections, and provide the telemetry data and/or calculations based on the telemetry data in a visual interface or control panel of control system 108. Monitoring software 110 may provide user 124 with an operational or functional status of one or more assets 104. In some embodiments, monitoring software 110 may trigger alarms or otherwise alert user 124 when an asset needs to be maintained (e.g., by email, text, warning light, or other electronic communications), and enable user 124 to adjust or instruct the user 124 how to adjust the settings of one or more assets 104 through control system 108.

Over time, the analytics, alarms, or calculations performed by monitoring software 110 may become outdated or no longer meet the needs of user 124, and new analytics and ways of maintaining and improving the functionality of assets 104 may be discovered or created. Or, as noted, the needs of user 124 in managing assets 104 may change.

For example, user 124 may desire to optimize performance for a first period of time, and then due to a change in corporate strategy, may desire to increase the longevity of assets 104 during a second period of time. It is to be appreciated that these different intents or user goals may require monitoring different analytics regarding assets 104 and may change how the assets 104 are operated and maintained. The existing monitoring software 110 may not include these additional calculations, alarms, or analytics, or may not be optimized to or directed to fulfilling the new needs of user 124. As such, monitoring software 110 may need to be updated, upgraded, or replaced, and new analytics or software may need to be installed.

APS 102 may maintain and upgrade the monitoring software 110 across one or more control systems 108 based on which assets 104 are being monitored, the needs of user 124, and the performance of those assets 104 over periods of time. APS 102 may help manage the functionality and maintenance of assets 104 by recommending and/or updating monitoring software 110 which ensures the proper metrics are being tracked and monitored across one or more control systems 108 and assets 104 are being properly maintained.

In some embodiments, APS 102 may include a recommendation engine 112 that generates a recommendation 114 on how to upgrade monitoring software 110 based on a variety of factors, including but not limited to: asset data 116, telemetry data 118, user intent 120, and purchase history 122.

Asset data 116 may include data about the various assets 104 that are being monitored by a control system 108. The asset data 116 may include an asset type (e.g., vehicle, pipeline, air conditioner unit, heater, pump, valve, etc.), quantity of assets, manufacturer, model number, year built, etc. In some embodiments, asset data 116 may also include other maintenance related information, such as: mileage, time or mileage of last oil change or other service, any parts that have been replaced (including identification of which parts, when, and which make and model numbers), etc. In some embodiments, asset data 116 may be retrieved through communications between APS 102 and control system 108 or monitoring software 110. In some embodiments, the asset data 116 may include past heuristics related to a customer's site. For example, recommendation engine 112 may be provided access to a fault log for an asset 104, or a past expense history or maintenance history.

Telemetry data 118 may include data received from the various sensors 106 used to monitor an asset 104. In some embodiments, telemetry data 118 may be received from control system 108. In other embodiments, telemetry data 118 may be received directly from assets 104, which may be configured to communicate telemetry data 118 to APS 102 or a cloud system to which APS 102 is connected. In some embodiments, user 124 may choose which telemetry data 118 to share and which telemetry data 118 not to share with APS 102. In some embodiments, APS 102 may either continuously (in real-time) or periodically (e.g., weekly, monthly, quarterly, yearly, etc.) receive updated or new telemetry data 118.

User intent 120 may indicate what performance or functionality of assets 104 user 124 wants to focus on improving through increased or more accurate upgrades to monitoring software 110. In some embodiments, user 124 may provide user intent 120 though a user interface or dashboard of APS 102. Examples of user intent 120 include, but are not limited to: health, predict, optimize, and excel.

Health may represent a user intent 120 focused on improving or maintaining a general health or ongoing functionality of an asset 104. Predict may represent a user intent 120 focused on being able to predict operational and routine maintenance costs for a particular asset 104 (e.g., and avoid unscheduled maintenances), which may be beneficial for budgeting and financial projections. Optimize may represent a user intent 120 focused on minimizing asset 104 downtime and maintaining throughput of a particular asset 104. Excel may represent an intent to maximize current throughput or functionality of an asset 104. In some embodiments, user 124 may submit multiple ranked, ordered, or weighted user intents 120.

Purchase history 122 may indicate a history of previous software purchases made in upgrading or improving monitoring software 110. In some embodiments, purchase history 122 may include a purchase of history of assets 104, parts for assets 104, maintenance packages for assets 104, etc. In some embodiments, asset data 116 may be determined based on purchase history 122. For example, if user 124 purchases an AC unit software upgrade, then APS 102 may determine that one of the assets 104 is an AC unit.

In some embodiments, recommendation engine 112 may determine from purchase history 122 what a user purchased for a first worksite (with one or more assets 104), when the user is looking to purchase software packages 126 for a second worksite (with one or more assets 104). For example, APS 102 may receive samples or have access to telemetry data of the assets 104 for the second worksite, and compare that data to the purchase history 122 for the first worksite to determine if any of the same or similar assets 104 seem to be operational at the second worksite. If there is an overlap in assets 104, recommendation engine 112 may recommend similar software packages 126 for the second worksite as were previously purchased for the first worksite.

In some embodiments, APS 102 may have access to real-time and/or historical telemetry data 118 obtained from assets 104A, 104B and/or control system 108. APS 102 may parse the telemetry data 118 into various time-series, compare the time-series sensor or telemetry data 118 to one or more baseline data models to identify the type of asset 104A, 104B associated with the telemetry data. For example, data from a heat sensor (e.g., an asset 104) may be distinguishable from data from a water pump (e.g., an asset 104). In some embodiments, APS 102 may further determine the configuration and/or software version or manufacturer and/or model number based on the telemetry data and baseline data comparisons.

In some embodiments, APS 102 may identify a first asset 104A at a particular worksite (or used by a particular client), and generate a common object model from which to identify other similar or identical assets 104 at the worksite or being used by the client. This generation and use of a common object model may increase the speed of processing, particularly in identify which assets 104A, 104B are being used and/or upgraded with new software. In some embodiments, APS 102 may determine from telemetry data 118 how multiple assets 104 are provisioned or installed in relation to each other and control system(s) 108 at a worksite. In some embodiments, APS 102 may generate a hierarchy of how assets 104 are deployed to execute a particular process in a facility (e.g., at a particular worksite, or within a particular company).

In some embodiments, recommendation engine 112 may combine or weigh asset data 116, telemetry data 118, user intent 120, and/or purchase history 122 to generate a recommendation 114. Recommendation 114 may include an indication of a software package 126 (also referred to as software 126) that may be purchased or downloaded to upgrade monitoring software 110 to improve the functionality and/or maintenance of assets 104 with which the control system 108 is communicatively coupled.

In some embodiments, recommendation engine 112 may account for a user's role. For example, different roles (e.g., building manager and engineer) may be responsible for monitoring different aspects of functionality of a particular asset 104, using different analytics. In some embodiments, recommendation engine 112 may provide only those software packages 126 that are specific to the user's role. In some embodiments, a user may authorize APS 102 to install any purchased software packages 126.

In some embodiments, recommendation engine 112 may use the purchase history 122 of a different user, in a similar role and/or industry, to make recommendations to a current user. For example, recommendation engine 112 may provide a recommendation 114 that another building manager in the oil and gas industry recently purchased software package 126 X, without disclosing who the other building manager is or the organization for which they worked. In some embodiments, if the other building manager works for the same organization as the purchasing building manager, the organization and/or name of the other building manager may be disclosed.

In some embodiments, APS 102 may analyze telemetry data 118 and asset data 116 to generate or identify one or more maintenance or repair actions, to be provided as part of recommendation 114, that user 124 may schedule or perform on the assets 104 indicated by asset data 116. For example, telemetry data 118 for asset 104A may be compared to expected telemetry data 118 for a well-maintained or fully operational asset 104A.

Based on the variance in the expected and actual telemetry data 118, APS 102 may identify one or more actions that are commonly used to address the variations. For example, if the variations indicate that the vibrations (e.g., telemetry data 118) of a fan belt (e.g., asset 104) are high, the recommendation actions may be to adjust a particular screw or change the belt. APS 102 may also recommend one or more software packages 126 that may be used to address or monitor telemetry data 118 that resulted in the problem or variance. For example, software package 126 may be configured to monitor vibrational frequency and include warning and maintenance actions to reduce fan belt vibrations or avoid potential failure or wear and tear conditions from occurring due to high vibrations of the fan belt.

As noted above, in some embodiments, APS 102 may periodically receive updated telemetry data 118. APS 102 may be configured to compare the updated telemetry data 118 to previously received telemetry data 118 and/or expected telemetry data for a particular asset 104, and both identify problems or potential problems and recommend one or more software packages 126 which are directed to addressing or preventing the problem through more accurate or effective monitoring.

Software package 126 may include any software that may installed on a control system 108. Software package 126 may include extensions or plugins to already operating monitoring software 110, or may include new monitoring software to replace or operate in addition to the existing monitoring software 110. In some embodiments, software package 126 may include additional analytics, warning, maintenance actions, tutorials, etc., that may be used to improve the monitoring and functionality of one or more assets 104.

Software package 126 may be configured to work with one or more assets 104 as identified by asset ID 128. Asset ID 128 may indicate with which asset features (e.g., asset type, manufacturer, make, model, year, industry, etc.) the particular software package 126 may be used. For example, a first software package 126 may be used with oil pipelines, while a second software package 126 may be used with Tractors from Company J.

In some embodiments, asset ID 128 may identify with which control system(s) 108 the software package 126 is compatible. And a particular software package 126 may include a preview of how the interface of control system 108 may change through the upgrade or installation of a particular software package 126.

Usage 130 may indicate what functionality or problems the particular software package 126 is directed to improving with regard to the asset 104 (e.g., such as high vibrations, improving gas mileage, increasing asset life or longevity, increasing speed or output). In some embodiments, software package 126 may be directed to address one or more of the predefined user intents 120 which may include any of the problems listed above. In some embodiments, usage 130 may include an indicator as to how well or how much of a priority each user intent 120 was in designing the software package 126. In some embodiments, usage 130 may indicate which analytics, or other information for a particular asset 104 are included as part of software package 126.

In some embodiments, usage 130 may indicate with which monitoring software 110, operating systems, and/or control system 108 the software package 126 is compatible. For example, there may be three different versions of monitoring software 110. X, Y, and Z. Software package 126 may be written to be compatible with certain monitoring software 110 and incompatible with other monitoring software. For example, usage 130 may indicate that software package 126 may be used with monitoring software X and Z, but not Y. As such, if control system 108 is operating monitoring software Y, then software package 126 may not be compatible with control system 108 and may not be provided as part of recommendation 114. In other embodiments, software package 126 may be provided as part of recommendation 114 with an additional recommendation to purchase, download, and install monitoring software Y which is required to execute software package 126. In some embodiments, APS 102 may allow the customer to add the incompatible software package to a wishlist for later purchase when/if a compatible version is released.

In some embodiments, recommendation 114 may be generated by evaluating the various software components or packages 126 available on a marketplace 132. Marketplace 132 may be an electronic marketplace in which software developers can upload and sell programs, apps, applications, plugins, and other components or other software packages 126 that may be used for the monitoring, maintaining, and improving the functionality of an asset 104 or set of assets 104.

Marketplace 132 may include reviews, prices, installation guides, previews, etc. for various available software packages 126. For the sake of simplicity, only one primary software package 126 is illustrated in marketplace 132. However, as illustrated, there may be multiple different software packages 126 from which recommendation engine 112 selects and/or that are presented to user 112 as part of recommendation 114. It is understood that marketplace 132 may include millions of different software packages 126 from a variety of different vendors and/or asset manufacturers directed to different problems or user intents 120.

In some embodiments, recommendation engine 112 may include a savings calculator 134 that is used to compute and calculate an estimated savings to user 124 over a defined period of time of a particular or recommended software package 126. For example, savings calculator 134 may receive telemetry data 118 and determine that a particular pump is using more than an average amount of power. Software package 126 may be a software package to improve the functionality of the pump to make it more efficient and use less power. Savings calculator 134 may be able to predict how much, in power or dollars, a company or facility would save by using the recommended software package 126.

In some embodiments, the savings may include or discount for the cost of purchasing the software package 126. For example, if the savings are $1500 over three years, and the software package costs $500, the savings calculator 134 may indicate the total savings over 3 years, the cost, and that the actual savings are $1000 over three years.

Figure 2:
FIG. 2 illustrates an example dashboard interface of APS, according to some embodiments.

FIG. 2 illustrates an example dashboard interface 200 of APS 102, according to some embodiments. In some embodiments, a user 124 may select which industry or industries are of interest to the user, and APS 102 may generate a corresponding interface 200. The exemplary assets illustrated in interface 200 may be related to the mining industry.

The example interface 200, illustrates a list of various mining industry related assets 104 on left side and an indication of the available software packages 126 available on marketplace 132 with regard to specified user intents 120 (health, predict, optimize, excel).

The interface 200 may indicate whether or not there are software packages 126 available to address the various user intents 120, how many software packages 126 are available, and/or an average grade or ranking of the available software packages 126. In some embodiments, interface 200 may include a price range or median or average price of the available software packages in the various categories.

In some embodiments, the listed assets may only include those assets 104 for which asset data 116 has been received as being in use at a facility user 124 is responsible for managing or for which software is seeking to be purchased.

Figure 3:
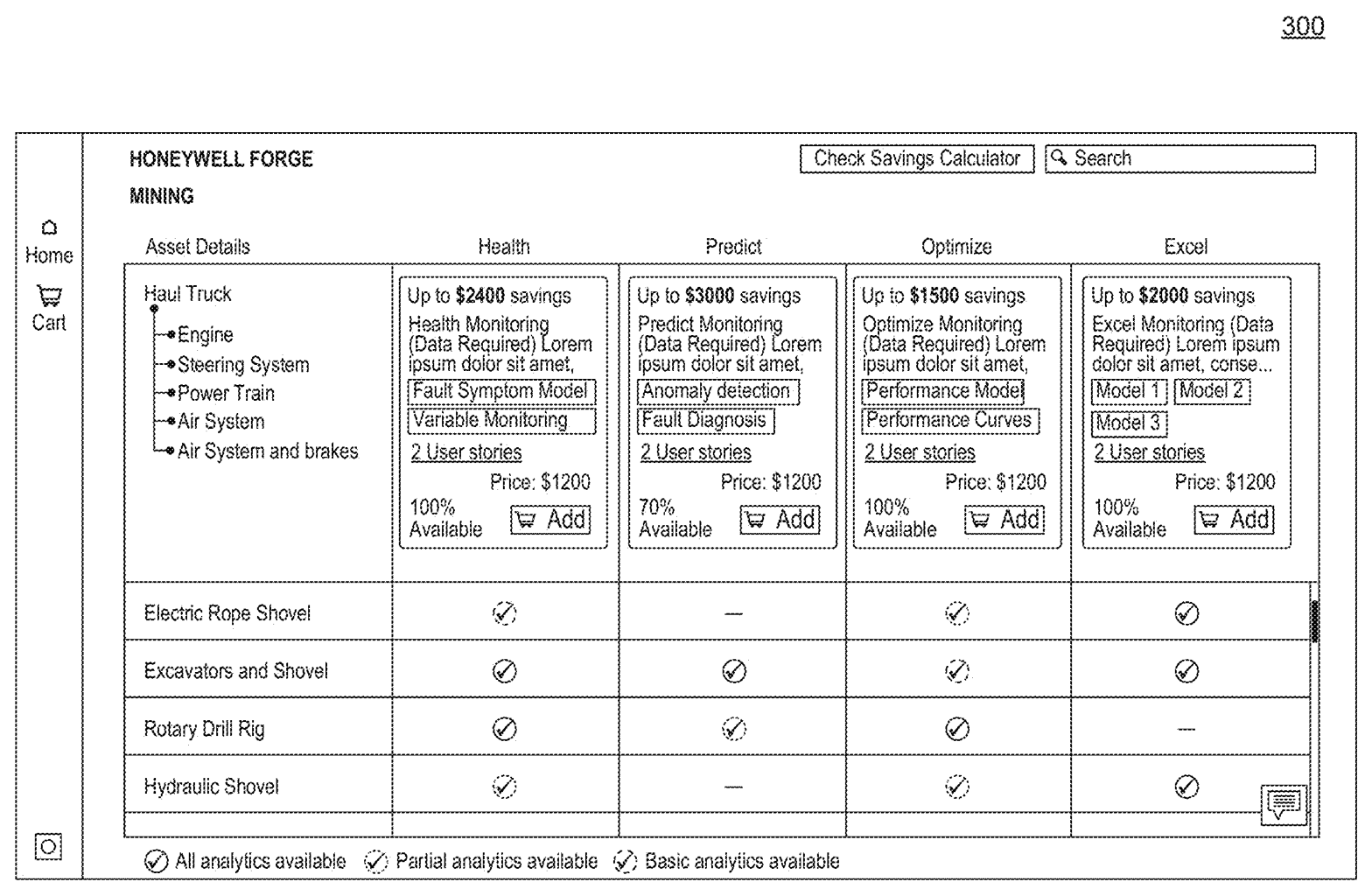

FIG. 3 illustrates an example software selection interface 300 of APS 102, according to some embodiments. In the example illustrated, a user 124 may have selected the Haul Truck asset 104 from the user interface 200. APS 102 may then display some common subsystems within the or associated with the haul truck (engine, steering system, etc.), and the available, top selling, or recommended software packages 126 that may be installed by user 124 in accordance with the various user intents 120. As illustrated, savings calculator 134 may also display projected savings for each software package 126. In some embodiments, different software packages 126 may be directed to the various subsystems.

FIG. 4 illustrates an example questionnaire 400 of APS 102, according to some embodiments. In some embodiments, APS 102 may use questionnaire 400 to receive asset data 116 and/or user intent 120 information to generate a recommendation 114. For example, the asset details may ask the user to specify an asset type (haul truck), a quantity, and what problem the user is facing in monitoring. The example selected problem is unscheduled maintenance. Using this information, APS 102 may generate a recommendation 114 as illustrated in FIG. 5.

FIG. 5 illustrates an example recommendation 500 provided by APS 102, according to some embodiments. Based on the asset data 116 and user intent 120 received through questionnaire 400, APS 102 recommend various software packages 126 that may be used with a haul truck to avoid unscheduled maintenance costs. As illustrated, savings calculator 134 may calculate the estimated savings in performing regular maintenance versus encountering unscheduled maintenance. The user 124 may then add one or both of the software packages.

FIG. 6 illustrates an example developer submission interface 600 of APS 102, according to some embodiments. As noted above, marketplace 132 may enable developers to submit and sell software packages 126. Developer submission interface 600 is an exemplary interface through which a developer provides information about the software package 126 they are submitting. Example information provided by the developer includes, but is not limited to: industry, asset class, asset type, creator, date, version. The developer may then upload one or more software package 126 files for submission/review. In some embodiments, the developer submission interface 600 may include a revenue sharing option, which may or may not be selected. The revenue sharing may cause revenue or sales of an uploaded software package 126 to be shared or split between both the developer and one or more other parties (e.g., such as an organization providing marketplace 132 or APS 102).

Figure 7:
FIG. 7 illustrates an example review status interface of APS, according to some embodiments.

FIG. 7 illustrates an example review status interface 700 of APS 102, according to some embodiments. In some embodiments, submitted software programs may be reviewed for accuracy and functionality to maintain quality control over which software packages 126 are made available via marketplace. The review status interface 700 illustrates an interface where a developer can see the review status of their various submissions of software programs.

Figure 8:
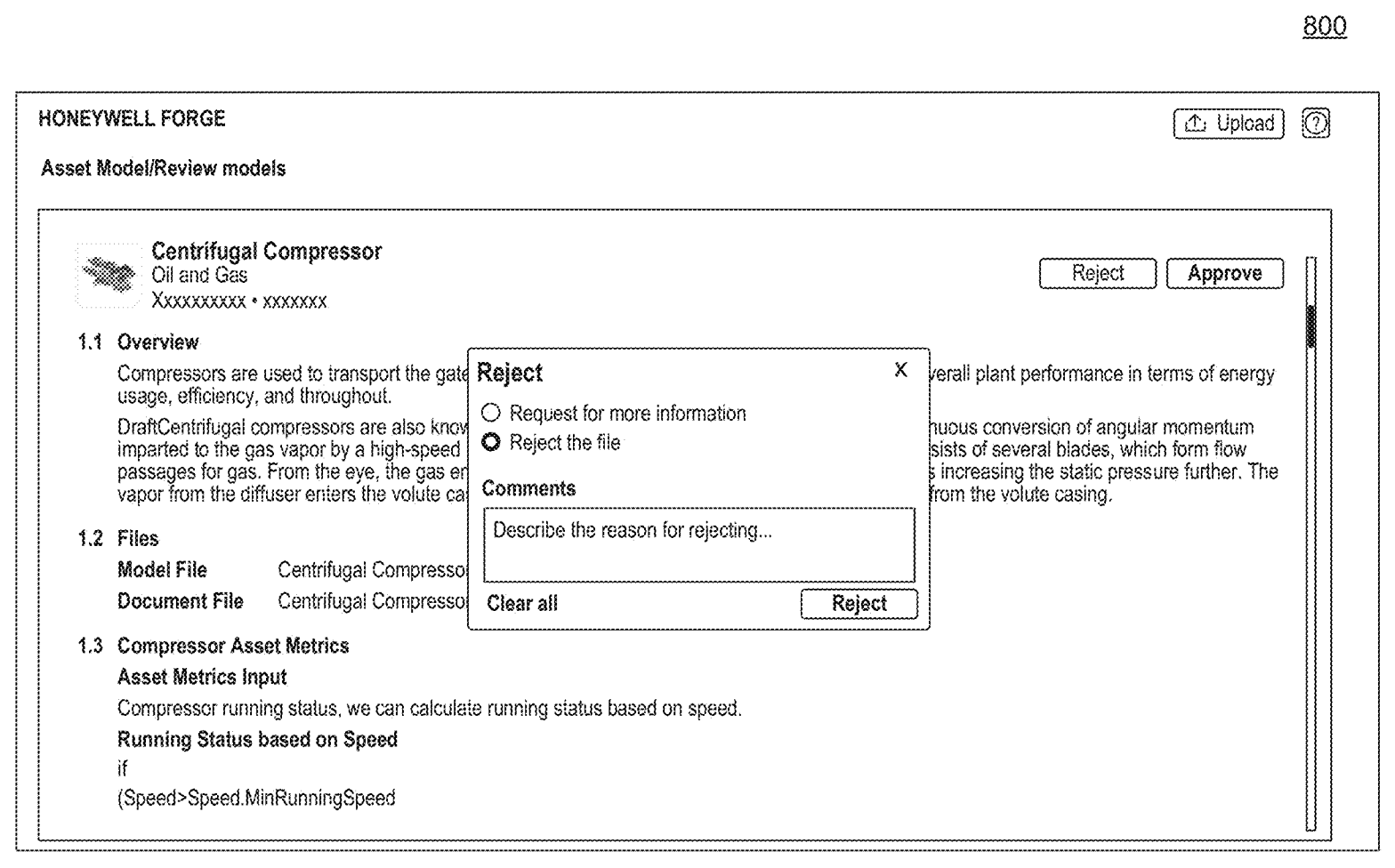

FIG. 8 illustrates an example software rejection interface 800 of APS 102, according to some embodiments. As illustrated, a reviewer of software submissions (which may include a committee of individuals) may reject an entire submission or one or more files, and may provide reasons for the rejection which are then provided to the developer to fix.

Figure 9:
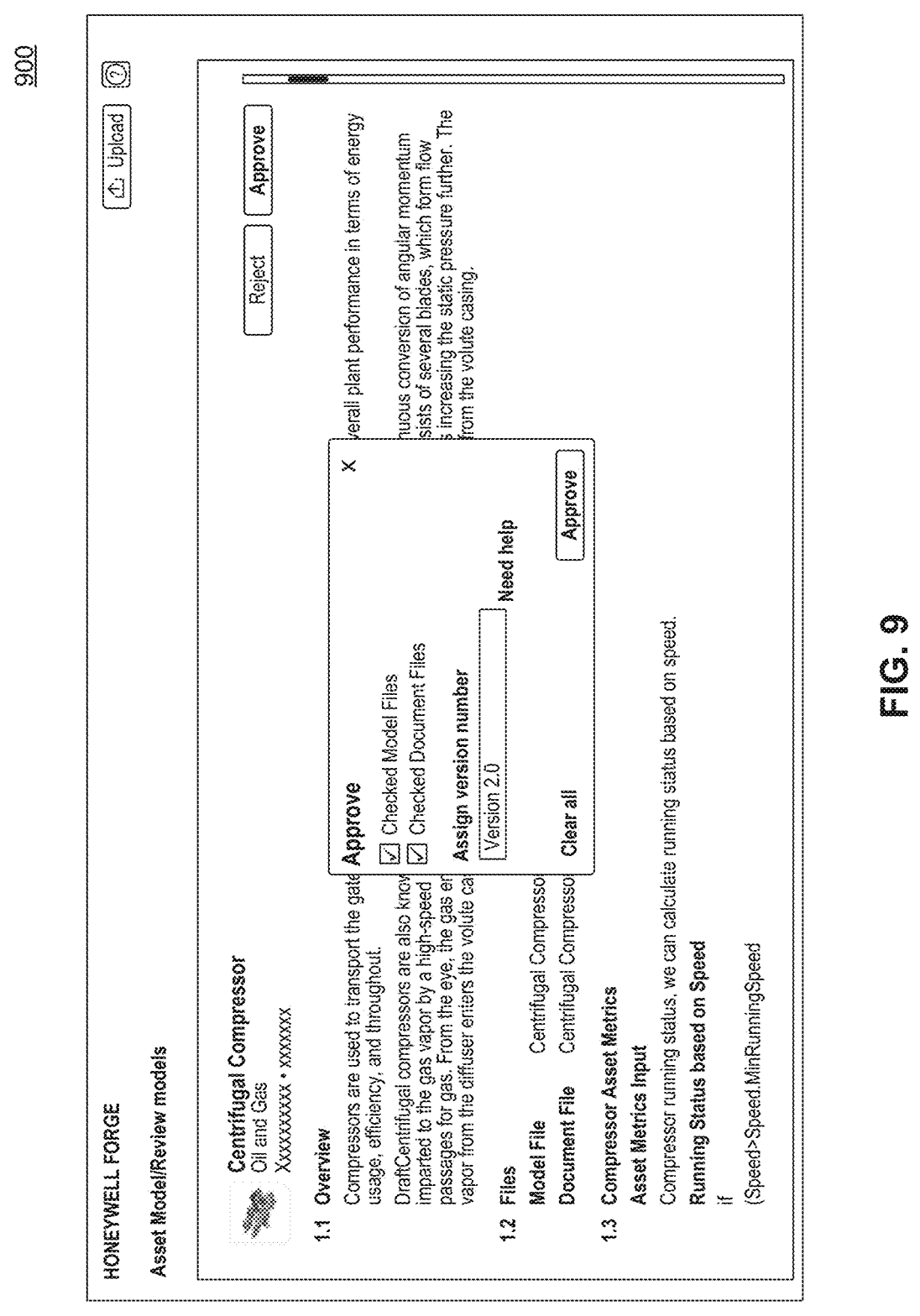

FIG. 9 illustrates an example software approval interface 900 of APS 102, according to some embodiments. As illustrated, a reviewer of software submissions (which may include a committee of subject matter experts) may accept one or more portions of a software program submission (and reject other portions). In some embodiments, the reviewer may specify a particular version number that has been accepted or approved for listing on marketplace 132.

Figure 10:
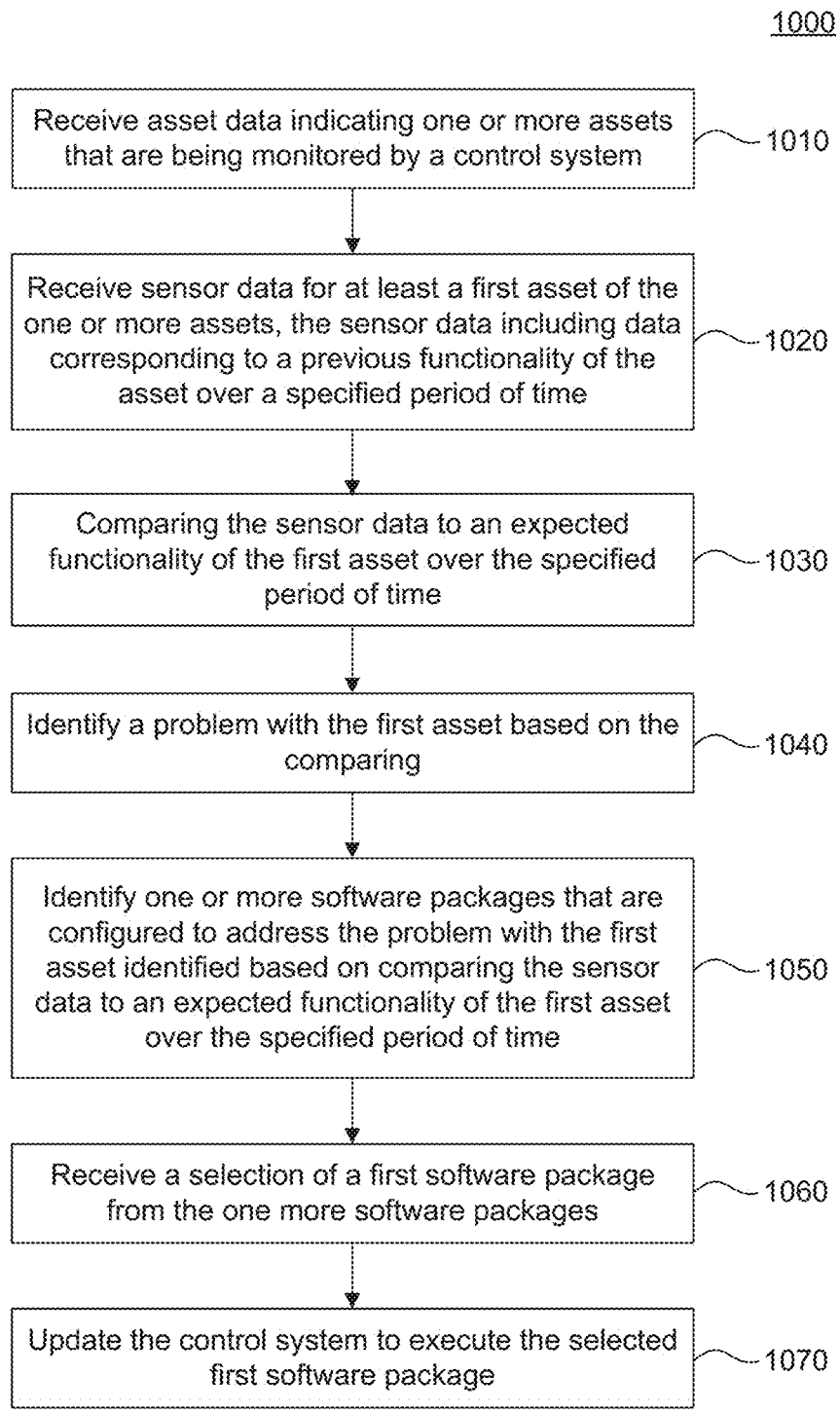
FIG. 10 is a flowchart illustrating example functionality of an asset performance optimization system (APS), according to some embodiments.

FIG. 10 is a flowchart 1000 illustrating example functionality of an asset performance optimization system (APS) 102, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Without limiting method 1000, method 1000 is described with reference to elements in the figures.

At 1010, asset data indicating one or more assets that are being monitored by a control system is received. For example, APS 102 may receive asset data 116 from a user 124 or through communications with control system 108. Asset data 116 may indicate which types of equipment are being monitored or controlled by a particular control system 108. In some embodiments, a particular asset 104 may have its own internal control system 108.

At 1020, telemetry data for at least a first asset of the one or more assets is received, the telemetry data including data corresponding to a previous functionality of the asset over a specified period of time. For example, APS 102 may receive telemetry data 106 through communications with control system 108 over a network, such as the Internet.

At 1030, the telemetry data is compared to an expected functionality of the first asset over the specified period of time. For example, recommendation engine 112 may compare telemetry data 118 to expected telemetry data for an asset 104 of a similar make, model, age, industry use, etc. as the asset 104 indicated by asset data 116 for which telemetry data 118 is received. This expected data (not shown) may be received from a manufacturer of the asset 104, or previous a tracking of how the asset 104 has performed in other environments.

At 1040, a problem with the first asset is identified based on the comparing. For example, based on the comparing of telemetry data 118 to the expected data, recommendation engine 112 may identify a problem with the asset 104. The problem could be any issue related to the functionality or maintenance of asset 104. For example, if the telemetry data 118 is in an expected range of telemetry data, then the problem could be routine maintenance. In some embodiments, the problem may be identified based on the specified user intent 120 in addition to or in lieu of the telemetry data 118 comparison to expected telemetry data.

At 1050, one or more software packages that are configured to address the problem with the first asset identified based on comparing the telemetry data to an expected functionality of the first asset over the specified period of time are identified. For example, recommendation engine 114 may identify one or more software packages 126 from marketplace 132 which are directed to solving or improving the situation associated with the identified user intent 120 or problem.

At 1060, a selection of a first software package from the one more software packages is received. For example, user 124 may select software package 126, which may then be downloaded and installed on control system 108 and integrated with monitoring software 110.

At 1070, the control system is updated to execute the selected first software package. For example, after the installation, control system 108 may be configured with the selected software package 126 and may begin monitoring the assets 104A, 104B using the newly installed software package 126.

Figure 12:
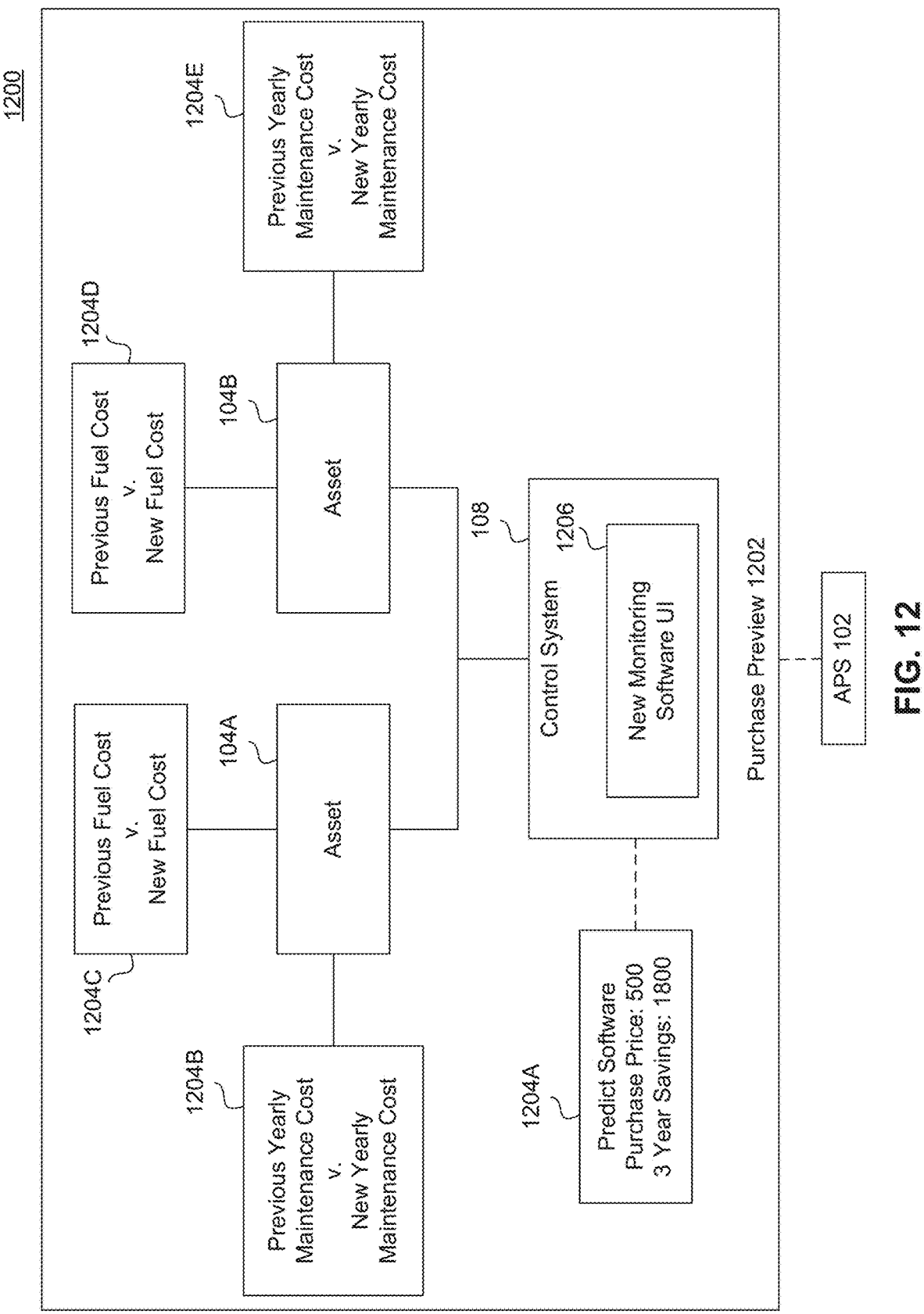
FIG. 12 illustrates a block diagram of a purchase preview, according to some example embodiments.

FIG. 12 illustrates a block diagram of a purchase preview 1202, according to some example embodiments. In some embodiments, APS 102 may provide a purchase preview 1202 via an interface on a user device, so a user can see the advantages or differences between their existing systems and purchasing a recommended or offered software package 126. The purchase preview 1202 may be accessible to the user via a laptop, desktop, or mobile computing device.

Purchase preview 1202 may include renderings of the control system 108 and assets 104A, 104B based on asset data 116 collected about the user's worksite. As illustrated, APS 102 may also provide for display comparisons 1204A-14204E between the system prior to the software purchase and predictions of the system after the software purchase.

For example, 1204A indicates that Predict Software may be purchased, for a purchase price $500 and has predicted 3 year savings of $1800. In some embodiments, 1204A may indicate a savings of $1300. 1204B and 1204E indicate the previous yearly maintenance costs for the assets 108A, 108B and the new yearly predicted maintenance costs using the Predict Software. Similarly, 1204C and 1204D indicate the previous yearly fuel costs for the assets 108A, 108B and the new yearly predicted fuel costs using the Predict Software. In some embodiments, 1204A may include a summary of the costs and savings that are displayed across 1204B-14204E.

In some embodiments, purchase preview 1202 may include a depiction or simulation of the new monitoring software user interface 1206 that is used by the Predict Software, so that the user can get a fuller appreciation and actual view of what their working environment may look and feel like if they purchased the new monitoring software. This immersive purchase preview 1202 may enable a user to visually see the differences prior to making a software purchase through APS 102.

In some embodiments, a user 124 may have access to a head-mounted device (HMD) such as augmented reality (AR)/virtual reality (VR) glasses, goggles, or a headset. APS 102 may connect to the HMD and may allow the user 124 to visualize the assets 104 in the facility with visual indicators that indicate which assets 124 are in need of repair, replacement, or maintenance activities. In some embodiment, the virtual display in the HMD provided by APS 102 may include an approximated cost of performing the indicated repair, replacement, or maintenance activities. In some embodiments, the display may indicate the benefit or savings associated with the maintenance, repair, or replacement activities, in terms of avoiding future maintenance, repair, or replacement activities, increased efficiency, or an extended life of the asset 104. This HMD connected to APS 102 may allow the user 124 to visually see the various costs associated with maintaining the different assets 104 in a particular facility.

In some embodiments, APS 102 may seamlessly connect into the customer's control system 108 or other information-technology system, such as a server. APS 102, with authorization from user 124, may access the customer's data and in real-time or near-real time provide the user 124 a visual experience of savings/fault detection/insights etc. that can be derived from the data after the purchase (of one or more software packages 126). In some embodiments, APS 102 may have a virtual-tour space user interface, where user 124 may be re-directed after the selection of a software package 126 (and asset 104) from the content catalog.

Through this virtual-tour user interface, APS 102 may provide user 124 with a visual and experience of the various advantages, savings, and/or insights that may be obtained through purchase of the software package 126, in the form of a preview. For example, APS 102 may indicate which assets 104 have a high probability of fault or failure based on a pre-purchase or preliminary analysis of telemetry data 118, and this may vary based on which module (e.g. Health, Predict, Optimize, Excel) the user 124 purchases. In other words, APS 102 may provide the user 124 with an experience of the solution beforehand which can help the user 124 in making a purchase decision.

Figure 13:
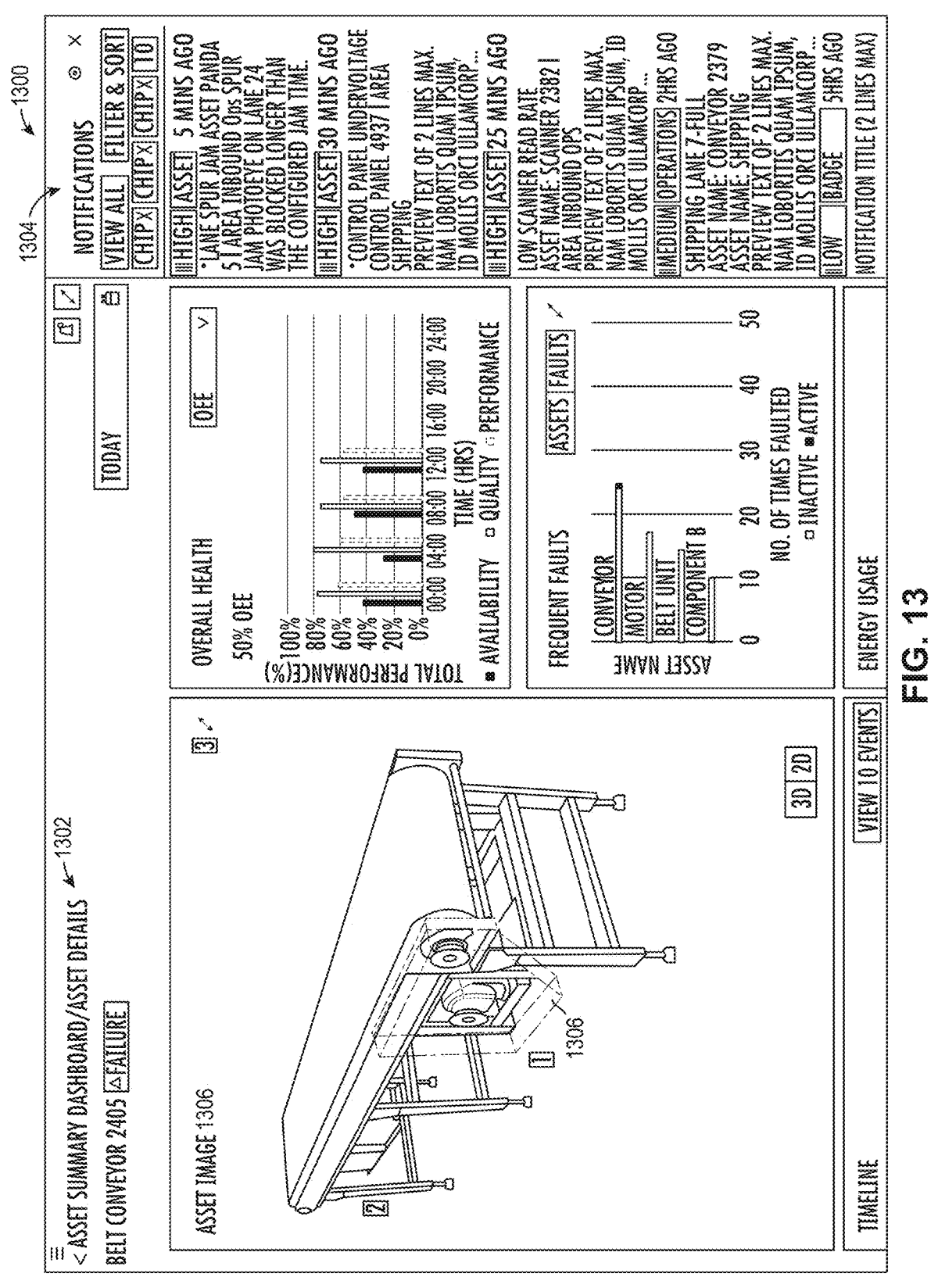

FIG. 13 illustrates an exemplary user interface 1300, according to one or more embodiments. In an embodiment, the user interface 1300 is a user interface of APS 102 that may be displayed for a user through either their laptop/mobile phone/desktop, or an HMD as a virtual display. As illustrated, a user may have an option of viewing the user interface 1300 and/or the 3D model 1306 of the asset(s) 104 displayed in 2D or 3D mode.

In one or more embodiments, a dashboard visualization is presented via the user interface 1300. In certain embodiments, the data visualization presented via the user interface 1300 presents one or more asset insights 1302 and/or one or more notifications 1304 via the dashboard visualization associated with the user interface 1300. In one or more embodiments, the data visualization presented via the user interface 1300 includes a 3D model 1306 associated with an asset from a portfolio of assets. In one or more embodiments, one or more events associated with the 3D model 1306 can be filtered and/or information associated with the one or more events can be displayed in response to selection of one or more interactive buttons associated with the 3D model 1306.

In some embodiments, APS 102 may provide a user interface or virtual display on a computing device, HMD, or any "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Traditionally, data analytics and/or digital transformation of data related to assets generally involves human interaction. However, often times a specialized worker (e.g., a manager) is responsible for a large portfolio of assets (e.g., 1000 buildings each with 100 assets such as a boiler, a chiller, a pump, sensors, etc.). Therefore, it is generally difficult to identify and/or fix issues with the large portfolio of assets. For example, in certain scenarios, multiple assets (e.g., 25 assets) from the large portfolio of assets may have an issue. Furthermore, a limited amount of time is traditionally spent on modeling of data related to assets to, for example, provide insights related to the data. As such, computing resources related to data analytics and/or digital transformation of data related to assets are traditionally employed in an inefficient manner.

As an example, it is generally desirable for management personnel (e.g., executives, managers, etc.) to be provided with an understanding of which assets from a portfolio of assets require service, which assets from a portfolio of assets should be serviced first, etc. For example, it is often desirable for management personnel (e.g., executives, plant managers, etc.) to be provided with a common view of rolled up metrics related to an industrial environment (e.g., an industrial plant) to, for example, increase asset and/or operation performance. However, in spite of various dashboard technology available today, metrics displayed do not provide insight to improve and/or adjust execution strategy by management personnel (e.g., executives, plant managers, etc.) without depending on technical personnel (e.g., engineers, etc.). Hence, management personnel (e.g., executives, plant managers, etc.) generally heavily depend on engineering analysis, which is generally involves extensive and/or time-consuming analysis in order to obtain metrics for an industrial environment. Additionally, it is generally desirable for management personnel (e.g., executives, managers, etc.) to be provided with improved technology to facilitate servicing of assets from a portfolio of assets. For example, traditional dashboard technology generally involves manual configuration of the dashboard to, for example, provide different insights for assets. Furthermore, traditional dashboard technology employed with dashboard data modelling of assets is generally implemented outside of a core application and/or asset model. Therefore, it is generally difficult to execute data modelling for assets in an efficient and/or accurate manner.

Furthermore, in various embodiments, one or more metrics are determined from the aggregated data to provide opportunity and/or performance insights for the assets. According to various embodiments, a dashboard visualization that presents issues associated with one or more assets from a portfolio of assets is provided. In various embodiments, the dashboard visualization is an enterprise application that allows a portfolio operator to remotely manage, investigate, and/or resolve issues associated with a portfolio of assets. In various embodiments, the dashboard visualization facilitates aggregation of asset performance data into a score or metric value such as, for example, a key performance indicator (KPI). In various embodiments, the dashboard visualization additionally or alternatively facilitates providing recommendations to improve asset performance by purchasing or replacing the assets. In various embodiments, the dashboard visualization additionally or alternatively facilitates remote control and/or altering of asset set points. In one or more embodiments, the issues associated with the one or more assets are ordered such that issues with a largest impact with respect to the portfolio of assets is presented first via the dashboard visualization. Impact may be based on cost to repair an asset, energy consumption associated with issues related to the one or more assets, savings lost associated with issues related to the one or more assets, etc.

Figure 14:
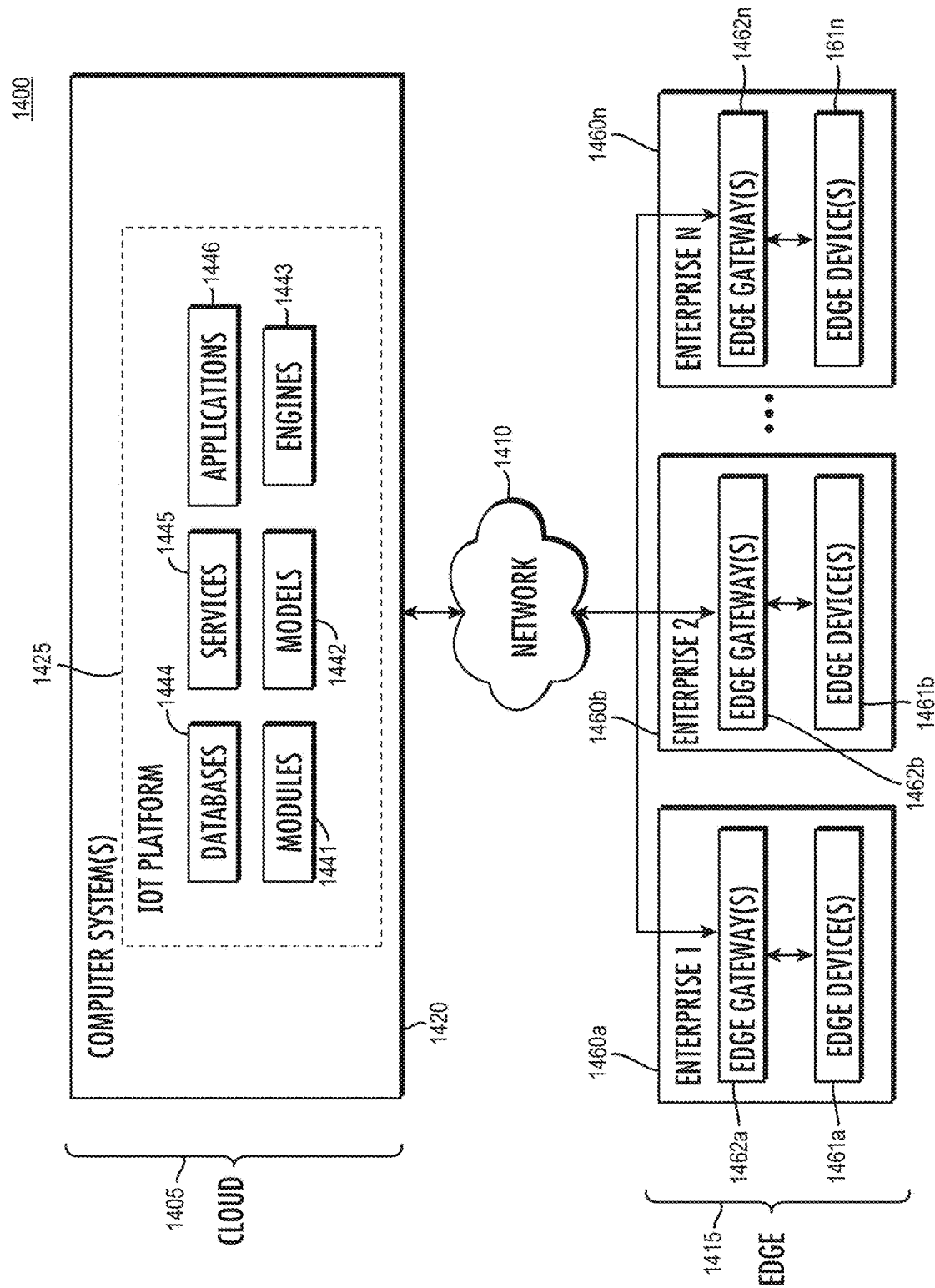
FIG. 14 illustrates an exemplary networked computing system environment, according to the present disclosure.

FIG. 14 illustrates an exemplary networked computing system environment 1400, according to the present disclosure. As shown in FIG. 14, networked computing system environment 1400 is organized into a plurality of layers including a cloud 1405 (e.g., cloud layer 1405), a network 1410 (e.g., network layer 1410), and an edge 1415 (e.g., edge layer 1415). As detailed further below, components of the edge 1415 are in communication with components of the cloud 1405 via network 1410.

In various embodiments, network 1410 is any suitable network or combination of networks and supports any appropriate protocol suitable for communication of data to and from components of the cloud 1405 and between various other components in the networked computing system environment 1400 (e.g., components of the edge 1415). According to various embodiments, network 1410 includes a public network (e.g., the Internet), a private network (e.g., a network within an organization), or a combination of public and/or private networks. According to various embodiments, network 1410 is configured to provide communication between various components depicted in FIG. 14. According to various embodiments, network 1410 comprises one or more networks that connect devices and/or components in the network layout to allow communication between the devices and/or components. For example, in one or more embodiments, the network 1410 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 1410 is implemented using cellular networks, satellite, licensed radio, or a combination of cellular, satellite, licensed radio, and/or unlicensed radio networks.

Components of the cloud 1405 include one or more computer systems 1420 that form a so-called "Internet-of-Things" or "IoT" platform 1425. It should be appreciated that "IoT platform" is an optional term describing a platform connecting any type of Internet-connected device, and should not be construed as limiting on the types of computing systems useable within IoT platform 1425. In particular, in various embodiments, computer systems 1420 includes any type or quantity of one or more processors and one or more data storage devices comprising memory for storing and executing applications or software modules of networked computing system environment 1400. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 1400.

Computer systems 1420 further include one or more software components of the IoT platform 1425. For example, in one or more embodiments, the software components of computer systems 1420 include one or more software modules to communicate with user devices and/or other computing devices through network 1410. For example, in one or more embodiments, the software components include one or more modules 1441, models 1442, engines 1443, databases 1444, services 1445, and/or applications 1446, which may be stored in/by the computer systems 1420 (e.g., stored on the memory), as detailed with respect to FIG. 2 below. According to various embodiments, the one or more processors are configured to utilize the one or more modules 1441, models 1442, engines 1443, databases 1444, services 1445, and/or applications 1446 when performing various methods described in this disclosure.

Accordingly, in one or more embodiments, computer systems 1420 execute a cloud computing platform (e.g., IoT platform 1425) with scalable resources for computation and/or data storage, and may run one or more applications on the cloud computing platform to perform various computer-implemented methods described in this disclosure. In some embodiments, some of the modules 1441, models 1442, engines 1443, databases 1444, services 1445, and/or applications 1446 are combined to form fewer modules, models, engines, databases, services, and/or applications. In some embodiments, some of the modules 1441, models 1442, engines 1443, databases 1444, services 1445, and/or applications 1446 are separated into separate, more numerous modules, models, engines, databases, services, and/or applications. In some embodiments, some of the modules 1441, models 1442, engines 1443, databases 1444, services 1445, and/or applications 1446 are removed while others are added.

The computer systems 1420 are configured to receive data from other components (e.g., components of the edge 1415) of networked computing system environment 1400 via network 1410. Computer systems 1420 are further configured to utilize the received data to produce a result. According to various embodiments, information indicating the result is transmitted to users via user computing devices over network 1410. In some embodiments, the computer systems 1420 is a server system that provides one or more services including providing the information indicating the received data and/or the result(s) to the users. According to various embodiments, computer systems 1420 are part of an entity which include any type of company, organization, or institution that implements one or more IoT services. In some examples, the entity is an IoT platform provider.

Components of the edge 1415 include one or more enterprises 1460a-1460n each including one or more edge devices 1461a-1461n and one or more edge gateways 1462a-1462n. For example, a first enterprise 1460a includes first edge devices 1461a and first edge gateways 1462a, a second enterprise 1460b includes second edge devices 1461b and second edge gateways 1462b, and an nth enterprise 1460n includes nth edge devices 1461n and nth edge gateways 1462n. As used herein, enterprises 1460a-1460n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

According to various embodiments, the edge devices 1461a-1461n represent any of a variety of different types of devices that may be found within the enterprises 1460a-1460n. Edge devices 1461a-1461n are any type of device configured to access network 1410, or be accessed by other devices through network 1410, such as via an edge gateway 1462a-1462n. According to various embodiments, edge devices 1461a-1461n are "IoT devices" which include any type of network-connected (e.g., Internet-connected) device. For example, in one or more embodiments, the edge devices 1461a-1461n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 1410 for collecting, sending, and/or receiving information. Each edge device 1461a-1461n includes, or is otherwise in communication with, one or more controllers for selectively controlling a respective edge device 1461a-1461n and/or for sending/receiving information between the edge devices 1461a-1461n and the cloud 1405 via network 1410. With reference to FIG. 2, in one or more embodiments, the edge 1415 include operational technology (OT) systems 1463a-1463n and information technology (IT) applications 1464a-1464n of each enterprise 1461a-1461n. The OT systems 1463a-1463n include hardware and software for detecting and/or causing a change, through the direct monitoring and/or control of industrial equipment (e.g., edge devices 1461a-1461n), assets, processes, and/or events. The IT applications 1464a-1464n includes network, storage, and computing resources for the generation, management, storage, and delivery of data throughout and between organizations.

The edge gateways 1462a-1462n include devices for facilitating communication between the edge devices 1461a-1461n and the cloud 1405 via network 1410. For example, the edge gateways 1462a-1462n include one or more communication interfaces for communicating with the edge devices 1461a-1461n and for communicating with the cloud 1405 via network 1410. According to various embodiments, the communication interfaces of the edge gateways 1462a-1462n include one or more cellular radios, Bluetooth, WiFi, near-field communication radios, Ethernet, or other appropriate communication devices for transmitting and receiving information. According to various embodiments, multiple communication interfaces are included in each gateway 1462a-1462n for providing multiple forms of communication between the edge devices 1461a-1461n, the gateways 1462a-1462n, and the cloud 1405 via network 1410. For example, in one or more embodiments, communication are achieved with the edge devices 1461a-1461n and/or the network 1410 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 1462a-1462n also include a processor and memory for storing and executing program instructions to facilitate data processing. For example, in one or more embodiments, the edge gateways 1462a-1462n are configured to receive data from the edge devices 1461a-1461n and process the data prior to sending the data to the cloud 1405. Accordingly, in one or more embodiments, the edge gateways 1462a-1462n include one or more software modules or components for providing data processing services and/or other services or methods of the present disclosure. With reference to FIG. 2, each edge gateway 1462a-1462n includes edge services 1465a-1465n and edge connectors 1466a-1466n. According to various embodiments, the edge services 1465a-1465n include hardware and software components for processing the data from the edge devices 1461a-1461n. According to various embodiments, the edge connectors 1466a-1466n include hardware and software components for facilitating communication between the edge gateway 1462a-1462n and the cloud 1405 via network 1410, as detailed above. In some cases, any of edge devices 1461a-n, edge connectors 1466a-n, and edge gateways 1462a-n have their functionality combined, omitted, or separated into any combination of devices. In other words, an edge device and its connector and gateway need not necessarily be discrete devices.

Figure 15:
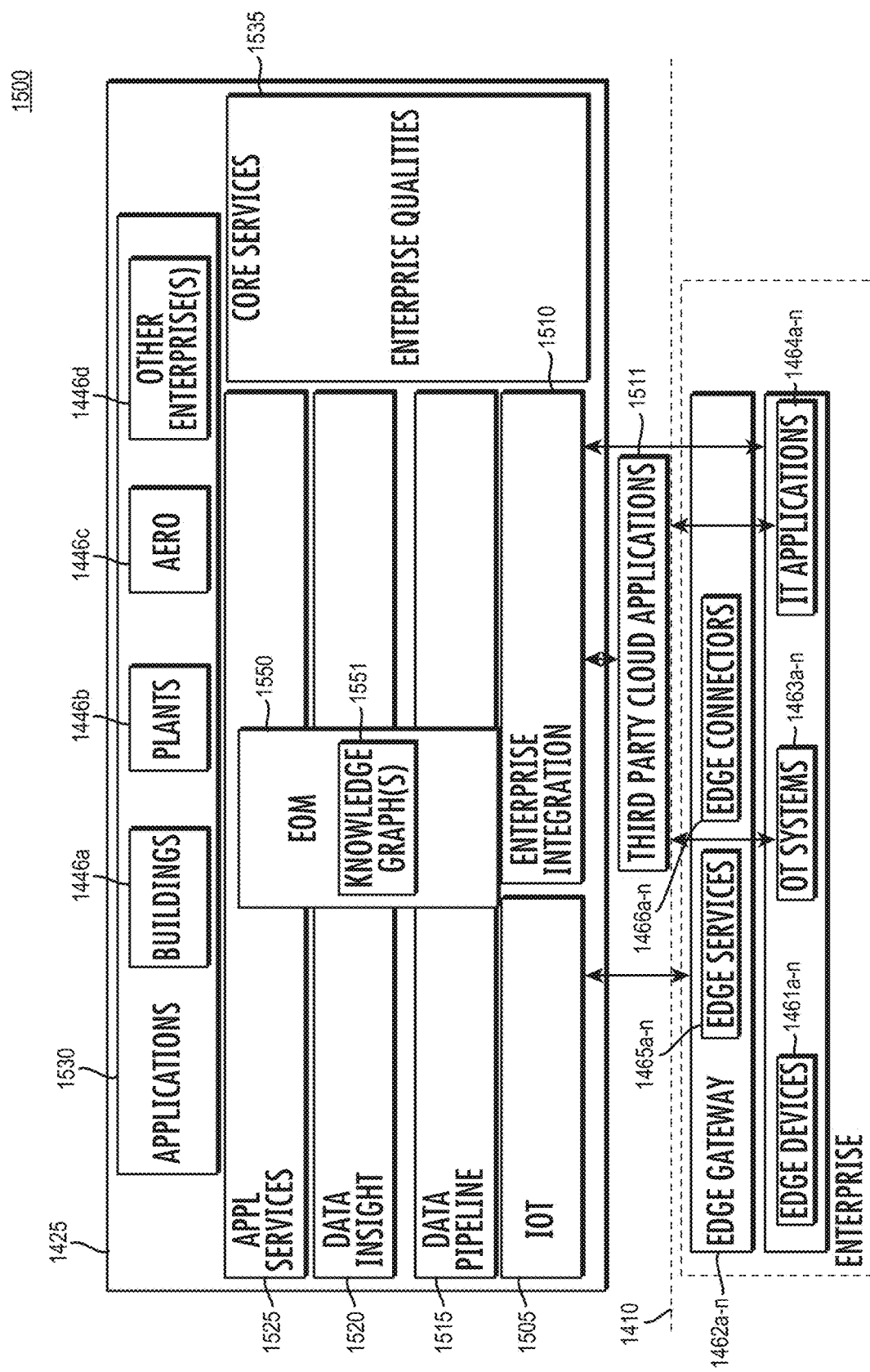
FIG. 15 illustrates a schematic block diagram of framework of the IoT platform, according to the present disclosure.

FIG. 15 illustrates a schematic block diagram of framework 1500 of the IoT platform 1425, according to the present disclosure. The IoT platform 1425 of the present disclosure is a platform for enterprise performance management that uses real-time accurate models and visual analytics to deliver intelligent actionable recommendations and/or analytics for sustained peak performance of the enterprise 1460a-1460n. The IoT platform 1425 is an extensible platform that is portable for deployment in any cloud or data center environment for providing an enterprise-wide, top to bottom view, displaying the status of processes, assets, people, and safety. Further, the IoT platform 1425 supports end-to-end capability to execute digital twins against process data and to translate the output into actionable insights, using the framework 151500, detailed further below.

As shown in FIG. 15, the framework 1500 of the IoT platform 1425 comprises a number of layers including, for example, an IoT layer 1505, an enterprise integration layer 1510, a data pipeline layer 1515, a data insight layer 1520, an application services layer 1525, and an applications layer 1530. The IoT platform 1425 also includes a core services layer 1535 and an extensible object model (EOM) 1550 comprising one or more knowledge graphs 1551. The layers 1505-235 further include various software components that together form each layer 1505-235. For example, in one or more embodiments, each layer 1505-235 includes one or more of the modules 1441, models 1442, engines 1443, databases 1444, services 1445, applications 1446, or combinations thereof. In some embodiments, the layers 1505-235 are combined to form fewer layers. In some embodiments, some of the layers 1505-235 are separated into separate, more numerous layers. In some embodiments, some of the layers 1505-235 are removed while others may be added.

The IoT platform 1425 is a model-driven architecture. Thus, the extensible object model 1550 communicates with each layer 1505-230 to contextualize site data of the enterprise 1460a-14460n using an extensible graph based object model (or "asset model"). In one or more embodiments, the extensible object model 1550 is associated with knowledge graphs 1551 where the equipment (e.g., edge devices 1461a-1461n) and processes of the enterprise 1460a-1460n are modeled. The knowledge graphs 1551 of EOM 1550 are configured to store the models in a central location. The knowledge graphs 1551 define a collection of nodes and links that describe real-world connections that enable smart systems. As used herein, a knowledge graph 1551: (i) describes real-world entities (e.g., edge devices 1461a-1461n) and their interrelations organized in a graphical interface; (ii) defines possible classes and relations of entities in a schema; (iii) enables interrelating arbitrary entities with each other; and (iv) covers various topical domains. In other words, the knowledge graphs 1551 define large networks of entities (e.g., edge devices 1461a-1461n), semantic types of the entities, properties of the entities, and relationships between the entities. Thus, the knowledge graphs 1551 describe a network of "things" that are relevant to a specific domain or to an enterprise or organization. Knowledge graphs 1551 are not limited to abstract concepts and relations, but can also contain instances of objects, such as, for example, documents and datasets. In some embodiments, the knowledge graphs 1551 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 1551 also include a semantic object model. The semantic object model is a subset of a knowledge graph 1551 that defines semantics for the knowledge graph 1551. For example, the semantic object model defines the schema for the knowledge graph 1551.

As used herein, EOM 1550 includes a collection of application programming interfaces (APIs) that enables seeded semantic object models to be extended. For example, the EOM 1550 of the present disclosure enables a customer's knowledge graph 1551 to be built subject to constraints expressed in the customer's semantic object model. Thus, the knowledge graphs 1551 are generated by customers (e.g., enterprises or organizations) to create models of the edge devices 1461a-1461n of an enterprise 1460a-1460n, and the knowledge graphs 1551 are input into the EOM 1550 for visualizing the models (e.g., the nodes and links).

The models describe the assets (e.g., the nodes) of an enterprise (e.g., the edge devices 1461a-1461n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 1461a-1461n) and the type of data that is being sensed by each sensor. According to various embodiments, a KPI framework is used to bind properties of the assets in the extensible object model 1550 to inputs of the KPI framework. Accordingly, the IoT platform 1425 is an extensible, model-driven end-to-end stack including: two-way model sync and secure data exchange between the edge 1415 and the cloud 1405, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 1425 is extensible with regards to edge devices 1461a-1461n and the applications 1446 that handle those devices 1461a-1461n. For example, when new edge devices 1461a-1461n are added to an enterprise 1460a-1460n system, the new devices 1461a-1461n will automatically appear in the IoT platform 1425 so that the corresponding applications 1446 understand and use the data from the new devices 1461a-1461n.

In some cases, asset templates are used to facilitate configuration of instances of edge devices 1461a-1461n in the model using common structures. An asset template defines the typical properties for the edge devices 1461a-1461n of a given enterprise 1460a-1460n for a certain type of device. For example, an asset template of a pump includes modeling the pump having inlet and outlet pressures, speed, flow, etc. The templates may also include hierarchical or derived types of edge devices 1461a-1461n to accommodate variations of a base type of device 1461a-1461n. For example, a reciprocating pump is a specialization of a base pump type and would include additional properties in the template. Instances of the edge device 1461a-1461n in the model are configured to match the actual, physical devices of the enterprise 1460a-1460n using the templates to define expected attributes of the device 1461a-1461n. Each attribute is configured either as a static value (e.g., capacity is 14000 BPH) or with a reference to a time series tag that provides the value. The knowledge graph 1551 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 1415 and the cloud 1405. For example, in one or more embodiments, the onboarding process includes a simple onboarding process, a complex onboarding process, and/or a standardized rollout process. The simple onboarding process includes the knowledge graph 1551 receiving raw model data from the edge 1415 and running context discovery algorithms to generate the model. The context discovery algorithms read the context of the edge naming conventions of the edge devices 1461a-1461n and determine what the naming conventions refer to. For example, in one or more embodiments, the knowledge graph 1551 receives "TMP" during the modeling phase and determine that "TMP" relates to "temperature." The generated models are then published. The complex onboarding process includes the knowledge graph 1551 receiving the raw model data, receiving point history data, and receiving site survey data. According to various embodiments, the knowledge graph 1551 then uses these inputs to run the context discovery algorithms. According to various embodiments, the generated models are edited and then the models are published. The standardized rollout process includes manually defining standard models in the cloud 1405 and pushing the models to the edge 1415.

The IoT layer 1505 includes one or more components for device management, data ingest, and/or command/control of the edge devices 1461a-1461n. The components of the IoT layer 1505 enable data to be ingested into, or otherwise received at, the IoT platform 1425 from a variety of sources. For example, in one or more embodiments, data is ingested from the edge devices 1461a-1461n through process historians or laboratory information management systems. The IoT layer 1505 is in communication with the edge connectors 1465a-1465n installed on the edge gateways 1462a-1462n through network 1410, and the edge connectors 1465a-1465n send the data securely to the IoT platform 1505. In some embodiments, only authorized data is sent to the IoT platform 1425, and the IoT platform 1425 only accepts data from authorized edge gateways 1462a-1462n and/or edge devices 1461a-1461n. According to various embodiments, data is sent from the edge gateways 1462a-1462n to the IoT platform 1425 via direct streaming and/or via batch delivery. Further, after any network or system outage, data transfer will resume once communication is re-established and any data missed during the outage will be backfilled from the source system or from a cache of the IoT platform 1425. According to various embodiments, the IoT layer 1505 also includes components for accessing time series, alarms and events, and transactional data via a variety of protocols.

The enterprise integration layer 1510 includes one or more components for events/messaging, file upload, and/or REST/OData. The components of the enterprise integration layer 1510 enable the IoT platform 1425 to communicate with third party cloud applications 1511, such as any application(s) operated by an enterprise in relation to its edge devices. For example, the enterprise integration layer 1510 connects with enterprise databases, such as guest databases, customer databases, financial databases, patient databases, etc. The enterprise integration layer 1510 provides a standard application programming interface (API) to third parties for accessing the IoT platform 1425. The enterprise integration layer 1510 also enables the IoT platform 1425 to communicate with the OT systems 1463a-1463n and IT applications 1464a-1464n of the enterprise 1460a-1460n. Thus, the enterprise integration layer 1510 enables the IoT platform 1425 to receive data from the third-party applications 1511 rather than, or in combination with, receiving the data from the edge devices 1461a-1461n directly.

The data pipeline layer 1515 includes one or more components for data cleansing/enriching, data transformation, data calculations/aggregations, and/or API for data streams. Accordingly, in one or more embodiments, the data pipeline layer 1515 pre-processes and/or performs initial analytics on the received data. The data pipeline layer 1515 executes advanced data cleansing routines including, for example, data correction, mass balance reconciliation, data conditioning, component balancing and simulation to ensure the desired information is used as a basis for further processing. The data pipeline layer 1515 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 1515 employs models and templates to define calculations and analytics. Additionally or alternatively, according to various embodiments, the data pipeline layer 1515 employs models and templates to define how the calculations and analytics relate to the assets (e.g., the edge devices 1461a-1461n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 1461a-1461n) instance is created, any associated calculation instances are also created with their input and output parameters linked to the appropriate attributes of the asset (e.g., edge device 1461a-1461n).

According to various embodiments, the IoT platform 1425 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 1460a-1460n performance to identify issues or opportunities, and the potential causes or drivers of the issues or opportunities. The IoT platform 1425 includes rich hierarchical symptom-fault models to identify abnormal conditions and their potential consequences. For example, in one or more embodiments, the IoT platform 1425 drill downs from a high-level condition to understand the contributing factors, as well as determining the potential impact a lower level condition may have. There may be multiple fault models for a given enterprise 1460a-1460n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 1425 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 1425 enables operators to quickly initiate maintenance measures when irregularities occur. According to various embodiments, the digital twin architecture of the IoT platform 1425 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 1461a-1461n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 1520 includes one or more components for time series databases (TDSB), relational/document databases, data lakes, blob, files, images, and videos, and/or an API for data query. According to various embodiments, when raw data is received at the IoT platform 1425, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 1515 accesses the data stored in the databases of the data insight layer 1520 to perform analytics, as detailed above.

The application services layer 1525 includes one or more components for rules engines, workflow/notifications, KPI framework, insights (e.g., actionable insights), decisions, recommendations, machine learning, and/or an API for application services. The application services layer 1525 enables building of applications 1446a-d. The applications layer 1530 includes one or more applications 1446a-d of the IoT platform 1425. For example, according to various embodiments, the applications 1446a-d includes a buildings application 1446a, a plants application 1446b, an aero application 1446c, and other enterprise applications 1446d. According to various embodiments, the applications 1446 includes general applications 1446 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 1446 is extensible such that each application 1446 is configurable for the different types of enterprises 1460a-1460n (e.g., buildings application 1446a, plants application 1446b, aero application 1446c, and other enterprise applications 1446d).

The applications layer 1530 also enables visualization of performance of the enterprise 1460a-1460n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 1535 includes one or more services of the IoT platform 1425. According to various embodiments, the core services 1535 include data visualization, data analytics tools, security, scaling, and monitoring. According to various embodiments, the core services 1535 also include services for tenant provisioning, single login/common portal, self-service admin, UI library/UI tiles, identity/access/entitlements, logging/monitoring, usage metering, API gateway/dev portal, and the IoT platform 1425 streams.

Figure 16:
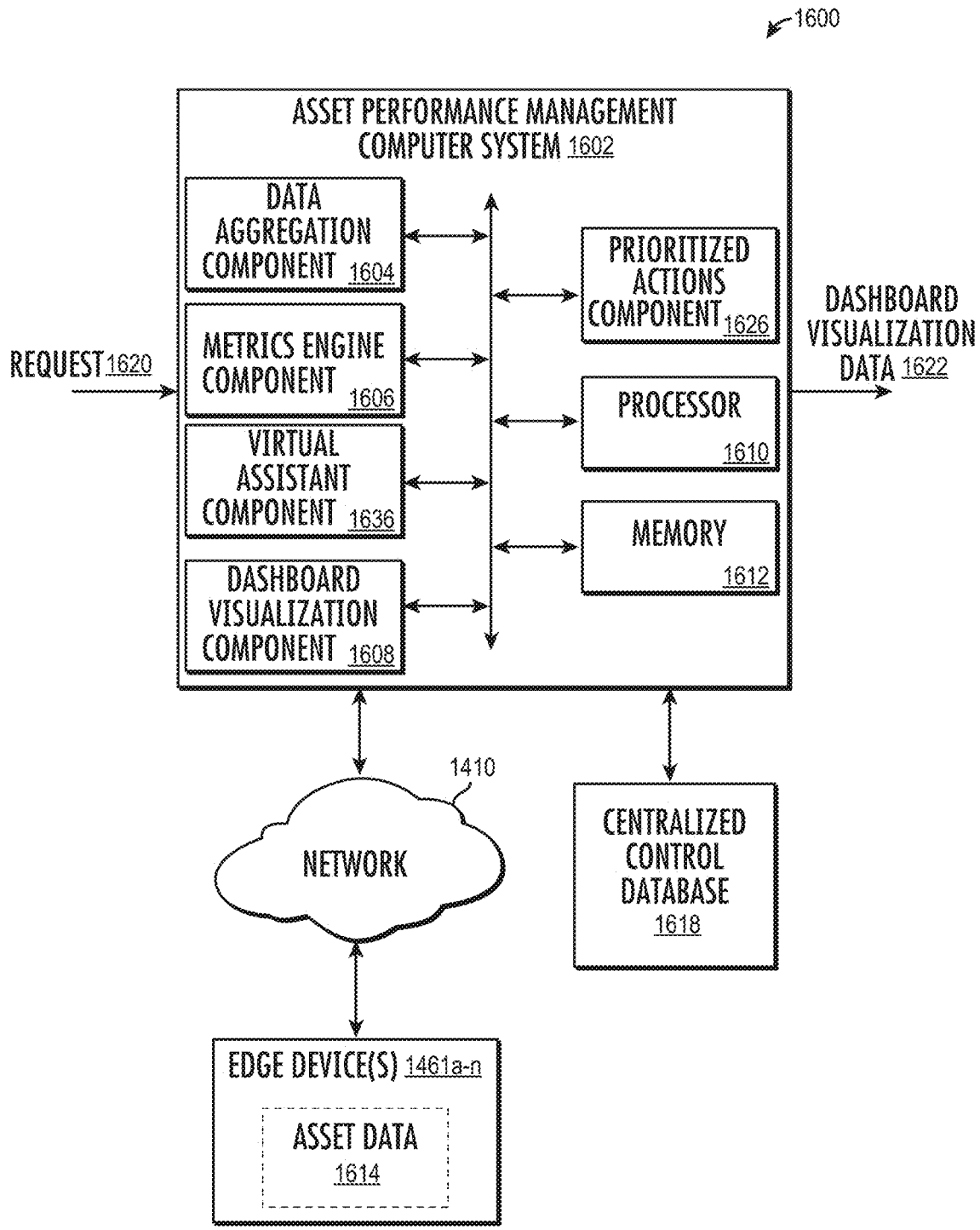
FIG. 16 illustrates a system that provides an exemplary environment according to one or more described features of one or more embodiments of the disclosure.

FIG. 16 illustrates a system 1600 that provides an exemplary environment according to one or more described features of one or more embodiments of the disclosure. According to an embodiment, the system 1600 includes an asset performance management computer system 1602 to facilitate a practical application of data analytics technology and/or digital transformation technology to provide optimization related to enterprise performance management. In one or more embodiments, the asset performance management computer system 1602 facilitates a practical application of metrics modeling and/or dynamic cache storage related to dashboard technology to provide optimization related to enterprise performance management. In one or more embodiments, the asset performance management computer system 1602 stores and/or analyzes data that is aggregated from one or more assets and/or one or more data sources associated with an enterprise system (e.g., a building system, an industrial system or another type of enterprise system). In one or more embodiments, the asset performance management computer system 1602 facilitates a practical application of a virtual assistant related to dashboard technology to provide optimization related to enterprise performance management. In one or more embodiments, the asset performance management computer system 1602 employs artificial intelligence to provide the practical application of a virtual assistant related to dashboard technology to provide optimization related to enterprise performance management.

In an embodiment, the asset performance management computer system 1602 is a server system (e.g., a server device) that facilitates a data analytics platform between one or more computing devices, one or more data sources, and/or one or more assets. In one or more embodiments, the asset performance management computer system 1602 is a device with one or more processors and a memory. In one or more embodiments, the asset performance management computer system 1602 is a computer system from the computer systems 1420. For example, in one or more embodiments, the asset performance management computer system 1602 is implemented via the cloud 1405. The asset performance management computer system 1602 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management computer system 1602 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management computer system 1602 improves performance of a computing device. For example, in one or more embodiments, the asset performance management computer system 1602 improves processing efficiency of a computing device (e.g., a server), reduces power consumption of a computing device (e.g., a server), improves quality of data provided by a computing device (e.g., a server), etc.

The asset performance management computer system 1602 includes a data aggregation component 1604, a metrics engine component 1606, a prioritized actions component 1626, a virtual assistant component 1636, and/or a dashboard visualization component 1608. Additionally, in one or more embodiments, the asset performance management computer system 1602 includes a processor 1610 and/or a memory 1612. In certain embodiments, one or more aspects of the asset performance management computer system 1602 (and/or other systems, apparatuses and/or processes disclosed herein) constitute executable instructions embodied within a computer-readable storage medium (e.g., the memory 1612). For instance, in an embodiment, the memory 1612 stores computer executable component and/or executable instructions (e.g., program instructions). Furthermore, the processor 1610 facilitates execution of the computer executable components and/or the executable instructions (e.g., the program instructions). In an example embodiment, the processor 1610 is configured to execute instructions stored in the memory 1612 or otherwise accessible to the processor 1610.

The processor 1610 is a hardware entity (e.g., physically embodied in circuitry) capable of performing operations according to one or more embodiments of the disclosure. Alternatively, in an embodiment where the processor 1610 is embodied as an executor of software instructions, the software instructions configure the processor 1610 to perform one or more algorithms and/or operations described herein in response to the software instructions being executed. In an embodiment, the processor 1610 is a single core processor, a multi-core processor, multiple processors internal to the asset performance management computer system 1602, a remote processor (e.g., a processor implemented on a server), and/or a virtual machine. In certain embodiments, the processor 1610 is in communication with the memory 1612, the data aggregation component 1604, the metrics engine component 1606, the prioritized actions component 1626, the virtual assistant component 1636 and/or the dashboard visualization component 1608 via a bus to, for example, facilitate transmission of data among the processor 1610, the memory 1612, the data aggregation component 1604, the metrics engine component 1606, the prioritized actions component 1626, the virtual assistant component 1636 and/or the dashboard visualization component 1608. The processor 1610 may be embodied in a number of different ways and, in certain embodiments, includes one or more processing devices configured to perform independently. Additionally or alternatively, in one or more embodiments, the processor 1610 includes one or more processors configured in tandem via a bus to enable independent execution of instructions, pipelining of data, and/or multi-thread execution of instructions.

The memory 1612 is non-transitory and includes, for example, one or more volatile memories and/or one or more non-volatile memories. In other words, in one or more embodiments, the memory 1612 is an electronic storage device (e.g., a computer-readable storage medium). The memory 1612 is configured to store information, data, content, one or more applications, one or more instructions, or the like, to enable the asset performance management computer system 1602 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset performance management computer system 1602 (e.g., the data aggregation component 1604 of the asset performance management computer system 1602) receives asset data 1614 from the edge devices 1461a-1461n. In one or more embodiments, the edge devices 1461a-1461n are associated with a portfolio of assets. For instance, in one or more embodiments, the edge devices 1461a-1461n include one or more assets in a portfolio of assets. The edge devices 1461a-1461n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, and/or one or more other devices that are connected to the network 110 for collecting, sending, and/or receiving information. In one or more embodiments, the edge device 1461a-1461n include, or is otherwise in communication with, one or more controllers for selectively controlling a respective edge device 1461a-1461n and/or for sending/receiving information between the edge devices 1461a-1461n and the asset performance management computer system 1602 via the network 1410. The asset data 1614 includes, for example, industrial data, connected building data, sensor data, real-time data, historical data, event data, process data, location data, and/or other data associated with the edge devices 1461a-1461n.

In certain embodiments, at least one edge device from the edge devices 1461a-1461n incorporates encryption capabilities to facilitate encryption of one or more portions of the asset data 1614. Additionally, in one or more embodiments, the asset performance management computer system 1602 (e.g., the data aggregation component 1604 of the asset performance management computer system 1602) receives the asset data 1614 via the network 1410. In one or more embodiments, the network 1410 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 1461a-1461n are associated with an industrial environment (e.g., a plant, etc.). Additionally or alternatively, in one or more embodiments, the edge devices 1461a-1461n are associated with components of the edge 1415 such as, for example, one or more enterprises 1460a-1460n.

In one or more embodiments, the data aggregation component 304 aggregates the asset data 1614 from the edge devices 1461a-1461n. For instance, in one or more embodiments, the data aggregation component 304 aggregates the asset data 1614 into a centralized control database 1618 configured as a database structure. The centralized control database 1618 is a cache memory (e.g., a dynamic cache) that dynamically stores the asset data 1614 based on interval of time and/or asset hierarchy level. For instance, in one or more embodiments, the centralized control database 1618 stores the asset data 1614 for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the centralized control database 1618 stores the asset data 1614 for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset.

In an example embodiment, the centralized control database 318 stores the asset data 1614 for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building. In the example embodiment, the centralized control database 318 also stores the asset data 1614 for the first interval of time (e.g., 1 hour to 24 hours minutes) for all connected buildings within a particular geographic region (e.g., a third asset hierarchy level), for the second interval of time (e.g., 1 day to 31 days) for all connected buildings within the particular geographic region, and for the third interval of time (e.g., 1 month to 12 months) for all connected buildings within the particular geographic region.

In another example embodiment, the centralized control database 1618 stores the asset data 1614 for the first interval of time (e.g., 1 hour to 24 hours minutes) for all assets in a plant (e.g., a second asset hierarchy level), for the second interval of time (e.g., 1 day to 31 days) for all the assets in the plant, and for the third interval of time (e.g., 1 month to 12 months) for the all the assets in the plant. In the example embodiment, the centralized control database 1618 also stores the asset data 1614 for the first interval of time (e.g., 1 hour to 24 hours minutes) for all plants at an industrial site (e.g., a third asset hierarchy level), for the second interval of time (e.g., 1 day to 31 days) for all plants at the industrial site, and for the third interval of time (e.g., 1 month to 12 months) for all plants at the industrial site.

In one or more embodiments, the data aggregation component 1604 repeatedly updates data of the centralized control database 1618 based on the asset data 1614 provided by the edge devices 1461a-1461n during the one or more intervals of time associated with the centralized control database 1618. For instance, in one or more embodiments, the data aggregation component 1604 stores new data and/or modified data associated with the asset data 1614. In one or more embodiments, the data aggregation component 1604 repeatedly scans the edge devices 1461a-1461n to determine new data for storage in the centralized control database 1618. In one or more embodiments, the data aggregation component 1604 formats one or more portions of the asset data 1614. For instance, in one or more embodiments, the data aggregation component 1604 provides a formatted version of the asset data 1614 to the centralized control database 1618. In an embodiment, the formatted version of the asset data 1614 is formatted with one or more defined formats associated with the one or more intervals of time and/or the one or more asset hierarchy levels. A defined format is, for example, a structure for data fields of the centralized control database 1618. In various embodiments, the formatted version of the asset data 1614 is stored in the centralized control database 1618.

In one or more embodiments, the data aggregation component 1604 identifies and/or groups data types associated with the asset data 1614 based on the one or more intervals of time (e.g., one or more reporting intervals of time) and/or the one or more asset hierarchy levels. In one or more embodiments, the data aggregation component 1604 employs batching, concatenation of the asset data 1614, identification of data types, merging of the asset data 1614, grouping of the asset data 1614, reading of the asset data 1614 and/or writing of the asset data 1614 to facilitate storage of the asset data 1614 within the centralized control database 1618. In one or more embodiments, the data aggregation component 1604 groups data from the asset data 1614 based on corresponding features and/or attributes of the data. In one or more embodiments, the data aggregation component 1604 groups data from the asset data 1614 based on corresponding identifiers (e.g., a matching asset hierarchy level, a matching asset, a matching connected building, etc.) for the asset data 1614. In one or more embodiments, the data aggregation component 1604 employs one or more locality-sensitive hashing techniques to group data from the asset data 1614 based on similarity scores and/or calculated distances between different data in the asset data 1614.

In one or more embodiments, the data aggregation component 1604 organizes the formatted version of the asset data 1614 based on a time series mapping of attributes for the asset data 1614. For instance, in one or more embodiments, the data aggregation component 1604 employs a hierarchical data format technique to organize the formatted version of the asset data 1614 in the centralized control database 1618. In one or more embodiments, the centralized control database 1618 dynamically stores data (e.g., one or more portions of the asset data 1614) based on type of data presented via a dashboard visualization. In one or more embodiments, data (e.g., one or more portions of the asset data 1614) aggregated from the edge devices 1461a-1461n is converted into one or more metrics (e.g., a KPI metric, a duty KPI, a duty target KPI) prior to being stored in the centralized control database 1618. In one or more embodiments, a metric (e.g. a KP metrics) consists of aspect data indicative of an aspect employed in a model to map an attribute to the metric (e.g., an operating power asset type attribute is mapped to a duty aspect, etc.), aggregation data indicative of information related to aggregation across time, rollup data indicative of an aggregate metric of an asset across an asset at one level as well as across a hierarchy asset, low limit data indicative of a low-limit constant derived from a digital twin model in real-time, high limit data indicative of a high-limit constant derived from a digital twin model in real-time, target data indicative of a target constant derived from a digital twin model in real-time, custom calculation data indicative of information related to custom calculations using aggregate data across time or asset, and/or other data related to the metric.

In one or more embodiments, the asset performance management computer system 1602 (e.g., the prioritized actions component 1626 of the asset performance management computer system 1602) receives a request 1620. In an embodiment, the request 1620 is a request to generate a dashboard visualization associated with a portfolio of assets. For instance, in one or more embodiments, the request 1620 is a request to generate a dashboard visualization associated with the edge devices 1461*a*-1461*n* (e.g., the edge devices 1461*a*-1461*n* included in a portfolio of assets).

In one or more embodiments, the request 1620 includes one or more asset descriptors that describe one or more assets in the portfolio of assets. For instance, in one or more embodiments, the request 1620 includes one or more asset descriptors that describe the edge devices 1461*a*-1461*n*. An asset descriptor includes, for example, an asset name, an asset identifier, an asset level and/or other information associated with an asset. Additionally or alternatively, in one or more embodiments, the request 1620 includes one or more user identifiers describing a user role for a user associated with access of a dashboard visualization. A user identifier includes, for example, an identifier for a user role name (e.g., a manager, an executive, a maintenance engineer, a process engineer, etc.). Additionally or alternatively, in one or more embodiments, the request 1620 includes one or more metrics context identifiers describing context for the metrics. A metrics context identifier includes, for example, an identifier for a plant performance metric, an asset performance metric, a goal (e.g., review production related to one or more assets, etc.). Additionally or alternatively, in one or more embodiments, the request 1620 includes one or more time interval identifier describing an interval of time for the metrics. A time interval identifier describes, for example, an interval of time for aggregated data such as hourly, daily, monthly, yearly etc. In one or more embodiments, a time interval identifier is a reporting time identifier describing an interval of time for the metrics.

In one or more embodiments, the request 1620 is a voice input. In an embodiment, the voice input includes and/or initiates a request to generate a dashboard visualization associated with the portfolio of assets. For instance, in one or more embodiments, the voice input includes and/or initiates a request to generate a dashboard visualization associated with the edge devices 1461*a*-1461*n* (e.g., the edge devices 1461*a*-1461*n* included in a portfolio of assets). In one or more embodiments, the voice input comprises voice input data associated with the request to generate the dashboard visualization. For example, in one or more embodiments, the voice input data associated with the voice input comprises one or more asset insight requests associated with the portfolio of assets. In an embodiment, the one or more asset insight requests include a phrase provided via the voice input data. In another embodiment, the one or more asset insight requests include a question provided via the voice input data. For instance, in an embodiment, a user can speak a phrase or a question via a computing device to provide the voice input data associated with the voice input.

In one or more embodiments, the voice input includes one or more attributes (e.g., asset insight attributes, a metrics context identifier, etc.) associated with the one or more asset insight requests. For instance, in one or more embodiments, the voice input includes, for example, an identifier for a plant performance metric, an asset performance metric indicator, a goal indicator, etc. In an example, for a phrase "What was the production and quality of product A?", the word "production" can be a first attribute and the word "quality" can be a second attribute. In one or more embodiments, the voice input additionally or alternatively includes one or more asset descriptors that describe one or more assets in the portfolio of assets. For instance, in one or more embodiments, the voice input additionally or alternatively includes one or more asset descriptors that describe the edge devices 1461*a*-1461*n*. An asset descriptor includes, for example, an asset name, an asset identifier, an asset level and/or other information associated with an asset. Additionally or alternatively, in one or more embodiments, the voice input includes the one or more user identifiers describing a user role for a user associated with access of a dashboard visualization. Additionally or alternatively, in one or more embodiments, the voice input includes time data describing a time and/or an interval of time for the metrics and/or one or more asset insights.

In one or more embodiments, in response to the request 1620, the metrics engine component 1606 determines one or more metrics for an asset hierarchy associated with the portfolio of assets. For instance, in one or more embodiments, the metrics engine component 1606 determines one or more metrics for an asset hierarchy associated with the edge devices 1461*a*-1461*n* in response to the request 1620. In one or more embodiments, the metrics engine component 1606 converts a portion of the asset data 1614 into a metric for the portion of the asset data 1614 and stores the metric for the portion of the asset data 1614 into the centralized control database 1618. In one or more embodiments, the metrics engine component 1606 determines the one or more metrics for the asset hierarchy based on a model related to a time series mapping of attributes for the asset data 1614. For example, in one or more embodiments, the metrics engine component 1606 determines the one or more metrics for the asset hierarchy based on time series mapping of attributes for the asset data 1614 with respect to the centralized control database 1618.

In one or more embodiments, in response to the request 1620, the prioritized actions component 1626 determines prioritized actions for the portfolio of assets based on attributes for the aggregated data stored in the centralized control database 1618. In an embodiment, the prioritized actions indicate which assets from the portfolio of assets should be serviced first. For example, in an embodiment, the prioritized actions indicate a first asset from the portfolio of assets that should be serviced first, a second asset from the portfolio of assets that should be serviced second, a third asset from the portfolio of assets that should be serviced third, etc. In one or more embodiments, the prioritized actions is a list of prioritized actions for the portfolio of assets based on impact to the portfolio. For instance, in one or more embodiments, the prioritized actions component 1626 ranks, based on impact of respective prioritized actions with respect to the portfolio of assets, the prioritized actions to generate the list of the prioritized actions. In one or more embodiments, the prioritized actions component 1626 groups the prioritized actions for the portfolio of assets based on relationships, features, and/or attributes between the aggregated data. In one or more embodiments, the prioritized actions component 1626 determines the prioritized actions for the portfolio of assets based on a digital twin model associated with one or more assets from the portfolio of assets. Additionally or alternatively, in one or more embodiments, the prioritized actions component 1626 determines the prioritized actions for the portfolio of assets based on a digital twin model associated with an operator identity associated with one or more assets from the portfolio of assets.

In one or more embodiments, the prioritized actions component 1626 determines the list of the prioritized actions for the portfolio of assets based on metrics associated with the aggregated data. In certain embodiments, in response to the request 1620, the prioritized actions component 1626 determines one or more metrics for an asset hierarchy associated with the portfolio of assets. For instance, in one or more embodiments, the prioritized actions component 1626 determines one or more metrics for an asset hierarchy associated with the edge devices 1461a-1461n in response to the request 1620. In one or more embodiments, the prioritized actions component 1626 converts a portion of the asset data 1614 into a metric for the portion of the asset data 1614 and stores the metric for the portion of the asset data 1614 into the centralized control database 1618. In one or more embodiments, the prioritized actions component 1626 determines the one or more metrics for the asset hierarchy based on a model related to a time series mapping of attributes, features, and/or relationships for the asset data 1614. For example, in one or more embodiments, the prioritized actions component 1626 determines the one or more metrics for the asset hierarchy based on time series mapping of attributes, features, and/or relationships for the asset data 1614 with respect to the centralized control database 1618.

In one or more embodiments, in response to the request 1620, the virtual assistant component 1636 performs a natural language query with respect to the voice input data to obtain the one or more attributes associated with the one or more asset insight requests. For example, in one or more embodiments, the virtual assistant component 1636 performs natural language processing with respect to the voice input data to obtain the one or more attributes associated with the one or more asset insight requests. In one or more embodiments, the virtual assistant component 1636 converts the voice input data into a text string such that the text string associated with one or more textual elements. In one or more embodiments, the virtual assistant component 1636 employs natural language processing (e.g., one or more natural language processing techniques) to determine textual data associated with the voice input data. In one or more embodiments, the virtual assistant component 1636 queries a natural language database based on the voice input to determine the one or more attributes associated with the one or more asset insight requests. In one or more embodiments, the virtual assistant component 1636 provides the one or more attributes, one or more tags, one or more labels, one or more classifications, and/or one or more other inferences with respect to the voice input data. For example, in one or more embodiments, the virtual assistant component 1636 performs part-of-speech tagging with respect to the voice input data to obtain the one or more attributes, one or more tags, one or more labels, one or more classifications, and/or one or more other inferences with respect to the voice input data. In one or more embodiments, the virtual assistant component 1636 performs one or more natural language processing queries with respect to the centralized control database 1618 based on the one or more tags, the one or more labels, the one or more classifications, the one or more attributes, and/or the one or more other inferences with respect to the voice input data.

In one or more embodiments, the virtual assistant component 1636 employs one or more machine learning techniques to facilitate determination of the one or more attributes, the one or more tags, the one or more labels, the one or more classifications, and/or the one or more other inferences with respect to the voice input data. For instance, in one or more embodiments, the virtual assistant component 1636 performs a fuzzy matching technique with respect to the voice input data to determine the one or more attributes associated with the one or more asset insight requests. Additionally or alternatively, in one or more embodiments, the virtual assistant component 1636 provides the voice input data to a neural network model configured for determining the one or more attributes associated with the one or more asset insight requests.

In one or more embodiments, the virtual assistant component 1636 obtains aggregated data associated with the portfolio of assets based on the one or more attributes, the one or more labels, the one or more tags, the one or more classifications, /or the one or more other inferences with respect to the voice input data. Additionally, in one or more embodiments, the virtual assistant component 1636 determines one or more asset insights for the portfolio of assets based on the aggregated data. In one or more embodiments, the virtual assistant component 1636 groups, based on the one or more attributes, the aggregated data based on one or more relationships between assets from the portfolio of assets. In one or more embodiments, the virtual assistant component 1636 applies the one or more attributes to at least a first model associated with a first type of asset insight and a second model associated with a second type of asset insight. In one or more embodiments, the virtual assistant component 1636 aggregates first output data from the first model and second output data from the second model to determine at least a portion of the aggregated data. In one or more embodiments, in response to the voice input, the virtual assistant component 1636 determines prioritized actions for the portfolio of assets based on the one or more attributes. In certain embodiments, in response to the voice input, the virtual assistant component 1636 determines one or more metrics for an asset hierarchy associated with the portfolio of assets. For instance, in one or more embodiments, the virtual assistant component 1636 determines one or more metrics for an asset hierarchy associated with the edge devices 1461a-1461n in response to the voice input.

In one or more embodiments, in response to the request 1620, the dashboard visualization component 1608 generates dashboard visualization data 1622 associated with the one or more metrics for the asset hierarchy. For instance, in one or more embodiments, the dashboard visualization component 1608 provides the dashboard visualization to an electronic interface of a computing device based on the dashboard visualization data 1622. In one or more embodiments, the dashboard visualization data 1622 and/or the dashboard visualization associated with the dashboard visualization data 1622 includes the metrics for an asset hierarchy associated with the portfolio of assets. In one or more embodiments, in response to the request 1620, the dashboard visualization component 1608 associates aspects of the asset data 1614 and/or metrics associated with the asset data 1614 stored in the centralized control database 1618 to provide the one or more metrics. For example, in one or more embodiment, in response to the voice input, the dashboard visualization component 1608 associates aspects of the asset data 1614 and/or metrics associated with the asset data 1614 stored in the centralized control database 1618 to provide the one or more metrics. In an aspect, the dashboard visualization component 1608 determines the aspects of the asset data 1614 and/or metrics associated with the asset data 1614 stored in the centralized control database 1618 based on the time series structure and/or the hierarchy structure of asset level of the centralized control database 1618.

In one or more embodiments, the dashboard visualization data 1622 and/or the dashboard visualization associated with the dashboard visualization data 1622 includes the prioritized actions for the portfolio of assets. In one or more embodiments, the dashboard visualization data 1622 and/or the dashboard visualization associated with the dashboard visualization data 1622 includes the list of the prioritized actions. In one or more embodiments, the dashboard visualization data 1622 and/or the dashboard visualization associated with the dashboard visualization data 1622 includes the grouping of the prioritized actions for the portfolio of assets. In one or more embodiments, the dashboard visualization data 1622 and/or the dashboard visualization associated with the dashboard visualization data 1622 includes the metrics for an asset hierarchy associated with the portfolio of assets.

In one or more embodiments, in response to the voice input, the dashboard visualization component 1608 generates the dashboard visualization data 1622 associated with the one or more metrics for the asset hierarchy. In one or more embodiments, the dashboard visualization data 1622 and/or the dashboard visualization associated with the dashboard visualization data 1622 is configured based on the one or more attributes associated with the voice input. In one or more embodiments, the dashboard visualization data 1622 and/or the dashboard visualization associated with the dashboard visualization data 1622 includes a dashboard visualization element configured to present sensor data related to the portfolio of assets, a dashboard visualization element configured to present control data related to the portfolio of assets, a dashboard visualization element configured to present labor management data related to the portfolio of assets, a dashboard visualization element configured to present warehouse execution data related to the portfolio of assets, a dashboard visualization element configured to present inventory data related to the portfolio of assets, a dashboard visualization element configured to present warehouse management data related to the portfolio of assets, a dashboard visualization element configured to present machine control data related to the portfolio of assets, and/or one or more other dashboard visualization elements associated with the one or more asset insights.

Additionally, in one or more embodiments, the dashboard visualization component 1608 performs one or more actions based on the metrics. For instance, in one or more embodiments, the dashboard visualization component 1608 generates dashboard visualization data 1622 associated with the one or more actions. In an embodiment, an action includes generating a user-interactive electronic interface that renders a visual representation of the one or more metrics. In another embodiment, an action from the one or more actions includes transmitting, to a computing device, one or more notifications associated with the one or more metrics. In another embodiment, an action from the one or more actions includes providing an optimal process condition for an asset associated with the asset data 1614. For example, in another embodiment, an action from the one or more actions includes adjusting a set-point and/or a schedule for an asset associated with the asset data 1614. In another embodiment, an action from the one or more actions includes one or more corrective action to take for an asset associated with the asset data 1614. In another embodiment, an action from the one or more actions includes providing an optimal maintenance option for an asset associated with the asset data 1614. In another embodiment, an action from the one or more actions includes an action associated with the application services layer 1525, the applications layer 1530, and/or the core services layer 1535.

Additionally, in one or more embodiments, the dashboard visualization component 1608 performs one or more actions based on the prioritized actions for the portfolio of assets. In an embodiment, an action includes generating a user-interactive electronic interface that renders a visual representation of the prioritized actions for the portfolio of assets and/or the one or more metrics. In another embodiment, an action from the one or more actions includes transmitting, to a computing device, one or more notifications associated with the prioritized actions for the portfolio of assets and/or the one or more metrics. In one or more embodiments, the dashboard visualization data 1622 and/or the dashboard visualization associated with the dashboard visualization data 1622 configures the dashboard visualization for remote control of one or more assets from the portfolio of assets based on the one or more attributes associated with the voice input. In one or more embodiments, the dashboard visualization data 1622 and/or the dashboard visualization associated with the dashboard visualization data 1622 configures a three-dimensional (3D) model of an asset from the portfolio of assets for the dashboard visualization based on the one or more attributes associated with the voice input (e.g., the voice input associated with the request 1620). In one or more embodiments, the dashboard visualization data 1622 and/or the dashboard visualization associated with the dashboard visualization data 1622 filters one or more events associated with the asset related to the 3D model based on the one or more attributes associated with the voice input. In one or more embodiments, the dashboard visualization data 1622 and/or the dashboard visualization associated with the dashboard visualization data 1622 configures the dashboard visualization for real-time collaboration between two or more computing devices based on the one or more attributes associated with the voice input.

Figure 11:
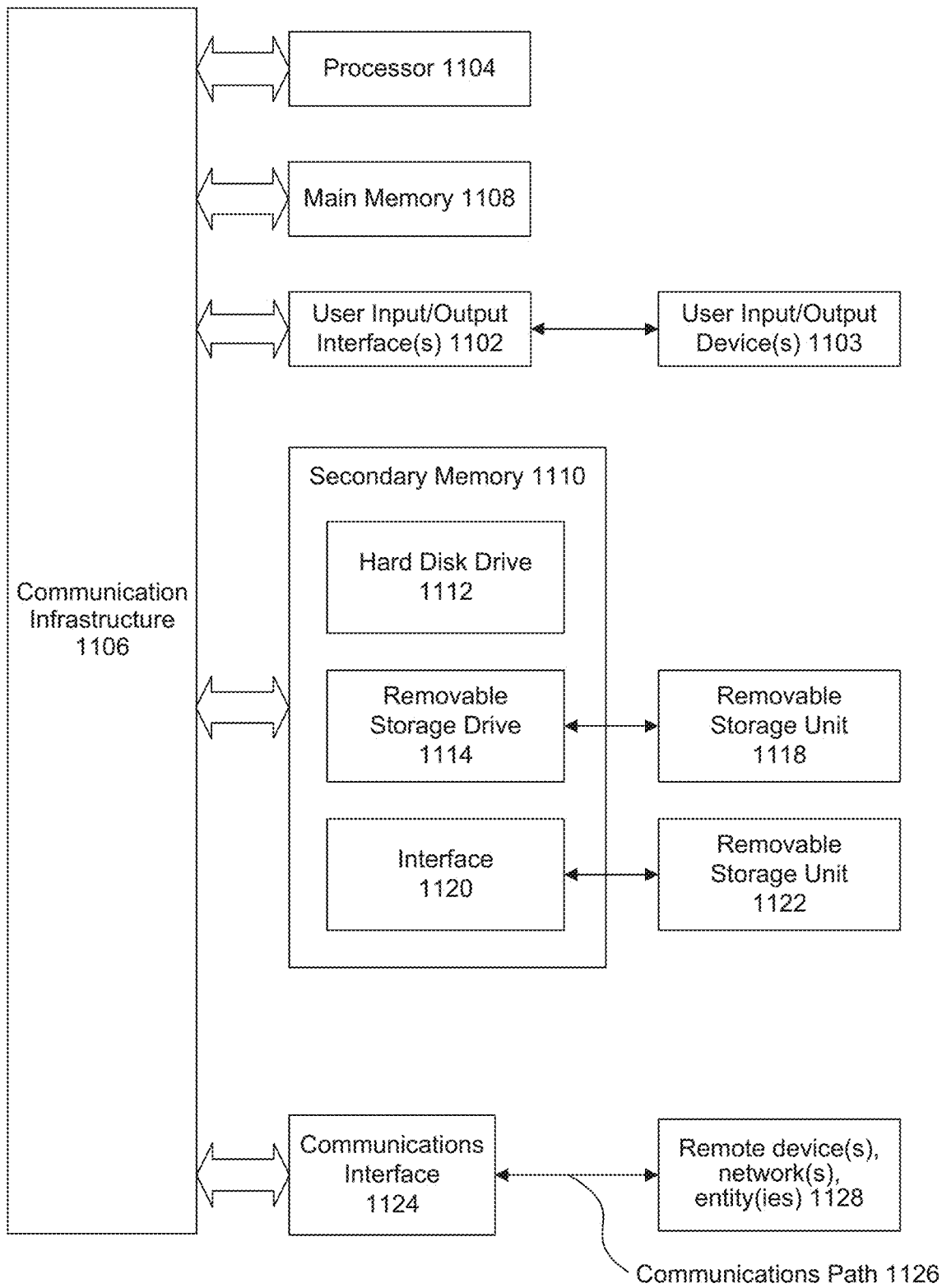
FIG. 11 illustrates an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include customer input/output device(s) 1103, such as monitors, keyboards, pointing devices, etc., which may communicate with communication infrastructure 1106 through customer input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving asset data associated with one or more assets, wherein the one or more assets are being monitored by a control system;
   receiving telemetry data for at least one asset of the one or more assets, the telemetry data including data corresponding to a previous functionality of the at least one asset over a specified period of time;
   comparing the telemetry data to an expected functionality of the at least one asset over the specified period of time;
   identifying a problem with the at least one asset based on the comparison;
   receiving a user intent indicating one or more problems faced by a user corresponding to the at least one asset;
   identifying one or more software packages that are configured to address each of the identified problem with the at least one asset based on the comparison and the one or more problems faced by the user;
   receiving a selection of a software package from the identified one or more software packages; and
   updating the control system to execute the selected software package.

2. The method of claim 1, wherein the selected software package includes one or more analytics to be monitored by the control system with regard to the at least one asset, wherein the one or more analytics were not previously monitored by the control system with regard to the at least one asset.

3. The method of claim 2, wherein the selected software package is compatible with an existing monitoring software that was previously installed and executing on the control system prior to the updating.

4. The method of claim 1, wherein the selected software package replaces an existing monitoring software that was previously installed and executing on the control system prior to the updating.

5. The method of claim 1, wherein the one or more assets comprise at least one of machinery and vehicles, and wherein the telemetry data monitor operations of at least one of the machinery and the vehicles.

6. A system, comprising:
   at least one memory; and
   at least one processor operatively connected to the at least one memory, the at least one processor configured to:
   receive asset data associated with one or more assets, wherein the one or more assets are being monitored by a control system;
   receive telemetry data for at least one asset of the one or more assets, the telemetry data including data corresponding to a previous functionality of the at least one asset over a specified period of time;
   compare the telemetry data to an expected functionality of the at least one asset over the specified period of time;
   identify a problem with the at least one asset based on the comparison;
   receive a user intent indicating one or more problems faced by a user corresponding to the at least one asset;
   identify one or more software packages that are configured to address each of the identified problem with the at least one asset based on the comparison and the one or more problems faced by the user;
   receive a selection of a software package from the identified one or more software packages; and
   update the control system to execute the selected software package.

7. The system of claim 6, wherein the selected software package includes one or more analytics to be monitored by the control system with regard to the at least asset, wherein the one or more analytics were not previously monitored by the control system with regard to the at least one asset.

8. The system of claim 7, wherein the selected software package is compatible with an existing monitoring software that was previously installed and executing on the control system prior to the updating.

9. The system of claim 6, wherein the selected software package replaces an existing monitoring software that was previously installed and executing on the control system prior to the updating.

10. The system of claim 6, wherein the one or more assets comprise at least one of machinery and vehicles, and wherein the telemetry data monitor operations of at least one of the machinery and the vehicles.

11. A non-transitory computer-readable medium having instructions stored thereon that, when executed by at least one computing device, cause the at least one computing device to perform operations comprising:
   receiving asset data indicating one or more assets that are being monitored by a control system;
   receiving asset data associated with one or more assets, wherein the one or more assets are being monitored by a control system;
   receiving telemetry data for at least one asset of the one or more assets, the telemetry data including data corresponding to a previous functionality of the at least one asset over a specified period of time;
   comparing the telemetry data to an expected functionality of the at least one asset over the specified period of time;
   identifying a problem with the at least one asset based on the comparison;
   receiving a user intent indicating one or more problems faced by a user corresponding to the at least one asset;
   identifying one or more software packages that are configured to address each of the identified problem with the at least one asset based on the comparison and the one or more problems faced by the user;
   receiving a selection of a software package from the identified one or more software packages; and
   updating the control system to execute the selected software package.

12. The non-transitory computer-readable medium of claim 11, wherein the selected software package includes one or more analytics to be monitored by the control system with regard to the at least one asset, wherein the one or more analytics were not previously monitored by the control system with regard to the at least one asset.

13. The non-transitory computer-readable medium of claim 12, wherein the selected software package is compatible with an existing monitoring software that was previously installed and executing on the control system prior to the updating.

14. The non-transitory computer-readable medium of claim 11, wherein the selected software package replaces an existing monitoring software that was previously installed and executing on the control system prior to the updating.

\* \* \* \* \*